(12) United States Patent
Cavazza et al.

(10) Patent No.: US 10,279,938 B2
(45) Date of Patent: May 7, 2019

(54) APPLICATION UNIT AND METHOD FOR APPLYING A WALL TO A HOLLOW BODY IN A MANUFACTURING PROCESS FOR PRODUCING A BEVERAGE CAPSULE

(71) Applicant: G.D SOCIETA' PER AZIONI, Bologna (IT)

(72) Inventors: Luca Cavazza, Bologna (IT); Sauro Uccellari, Bologna (IT); Umberto Zanetti, Modena (IT); Andrea Biondi, Bologna (IT)

(73) Assignee: G.D. SOCIETA' PER AZIONI, Bologna (IT)

( * ) Notice: Subject to any disclaimer, the term of this patent is extended or adjusted under 35 U.S.C. 154(b) by 344 days.

(21) Appl. No.: 15/117,755

(22) PCT Filed: Feb. 13, 2015

(86) PCT No.: PCT/IB2015/051089
§ 371 (c)(1),
(2) Date: Aug. 10, 2016

(87) PCT Pub. No.: WO2015/121838
PCT Pub. Date: Aug. 20, 2015

(65) Prior Publication Data
US 2016/0355286 A1    Dec. 8, 2016

(30) Foreign Application Priority Data
Feb. 13, 2014 (IT) ............... BO2014A0070

(51) Int. Cl.
*B65B 29/02* (2006.01)
*B29C 65/00* (2006.01)
(Continued)

(52) U.S. Cl.
CPC .............. *B65B 29/02* (2013.01); *B29C 65/18* (2013.01); *B29C 65/7841* (2013.01);
(Continued)

(58) Field of Classification Search
CPC ............ B29C 65/7882; B29C 65/7885; B29C 65/7841; B29C 65/7847; B29C 65/18;
(Continued)

(56) References Cited

U.S. PATENT DOCUMENTS

| 3,886,708 A * | 6/1975 | Guse ....................... B29C 65/18 |
| | | 53/329.4 |
| 4,152,566 A * | 5/1979 | Magerle .................. B29C 43/08 |
| | | 219/655 |

(Continued)

FOREIGN PATENT DOCUMENTS

| DE | 2322947 A1 | 11/1974 |
| EP | 1 892 199 A1 | 2/2008 |

(Continued)

OTHER PUBLICATIONS

International Search Report for Application No. PCT/IB2015/051089, dated Aug. 8, 2015.

*Primary Examiner* — Thanh K Truong
*Assistant Examiner* — Thomas M Wittenschlaeger
(74) *Attorney, Agent, or Firm* — Marshall, Gerstein & Borun LLP

(57) ABSTRACT

Unit and method for applying a wall to a hollow body in a manufacturing process for producing a beverage capsule; are provided: a sealing conveyor which advances along a sealing path; a sealing head conveyed by the sealing conveyor and which supports a gripping device for gripping the wall and a retaining device suited to retain the hollow body; a first feed station for feeding the wall to the sealing head, so that the wall is gripped by the gripping device; and a second feed
(Continued)

station arranged downstream from the first feed station along the sealing path, for feeding the hollow body to the sealing head, so the hollow body is coupled to the wall gripped by the gripping device, and is retained by the retaining device.

25 Claims, 18 Drawing Sheets

(51) Int. Cl.
| | | |
|---|---|---|
| *B29C 65/18* | (2006.01) | |
| *B29C 65/78* | (2006.01) | |
| *B29C 69/00* | (2006.01) | |
| *B65B 43/46* | (2006.01) | |
| *B65B 51/16* | (2006.01) | |
| *B65B 65/00* | (2006.01) | |
| *B65B 39/12* | (2006.01) | |
| *B65B 39/14* | (2006.01) | |
| *B65B 41/06* | (2006.01) | |
| *B65B 43/44* | (2006.01) | |
| *B65B 7/28* | (2006.01) | |
| *B29L 31/00* | (2006.01) | |

(52) U.S. Cl.
CPC .... *B29C 65/7882* (2013.01); *B29C 66/53462* (2013.01); *B29C 66/849* (2013.01); *B29C 69/006* (2013.01); *B65B 7/2878* (2013.01); *B65B 39/12* (2013.01); *B65B 39/14* (2013.01); *B65B 41/06* (2013.01); *B65B 43/44* (2013.01); *B65B 43/46* (2013.01); *B65B 51/16* (2013.01); *B65B 65/003* (2013.01); *B29C 65/7847* (2013.01); *B29C 65/7885* (2013.01); *B29C 66/112* (2013.01); *B29C 66/131* (2013.01); *B29C 66/81431* (2013.01); *B29C 66/8322* (2013.01); *B29C 66/91421* (2013.01); *B29C 66/91431* (2013.01); *B29L 2031/712* (2013.01)

(58) Field of Classification Search
CPC ............... B29C 66/849; B29C 66/131; B29C 66/91431; B29C 66/53462; B29C 66/112; B29C 66/81431; B29C 66/91421; B29C 66/8322; B29C 69/006; B65B 29/02; B65B 39/14; B65B 39/12; B65B 43/46; B65B 43/44; B65B 51/16; B65B 7/2878; B65B 41/06; B65B 65/003; B29L 2031/712

See application file for complete search history.

(56) References Cited

U.S. PATENT DOCUMENTS

| | | | | |
|---|---|---|---|---|
| 4,306,849 A * | 12/1981 | Cress | ....................... | B29C 53/50 |
| | | | | 156/517 |
| 4,547,645 A * | 10/1985 | Smith | ................ | B21D 51/2676 |
| | | | | 198/403 |
| 6,165,114 A * | 12/2000 | Stahlecker | ............ | B29B 13/024 |
| | | | | 493/109 |
| 9,708,134 B2 * | 7/2017 | Rea | ......................... | B65B 29/02 |
| 2008/0299262 A1* | 12/2008 | Reati | ..................... | B65B 29/022 |
| | | | | 426/84 |
| 2010/0107568 A1* | 5/2010 | Inaba | .................. | B29C 65/7873 |
| | | | | 53/478 |

FOREIGN PATENT DOCUMENTS

| | | |
|---|---|---|
| EP | 2 465 792 A2 | 6/2012 |
| FR | 2229612 A1 | 12/1974 |
| WO | WO-2013/144837 A1 | 10/2013 |

* cited by examiner

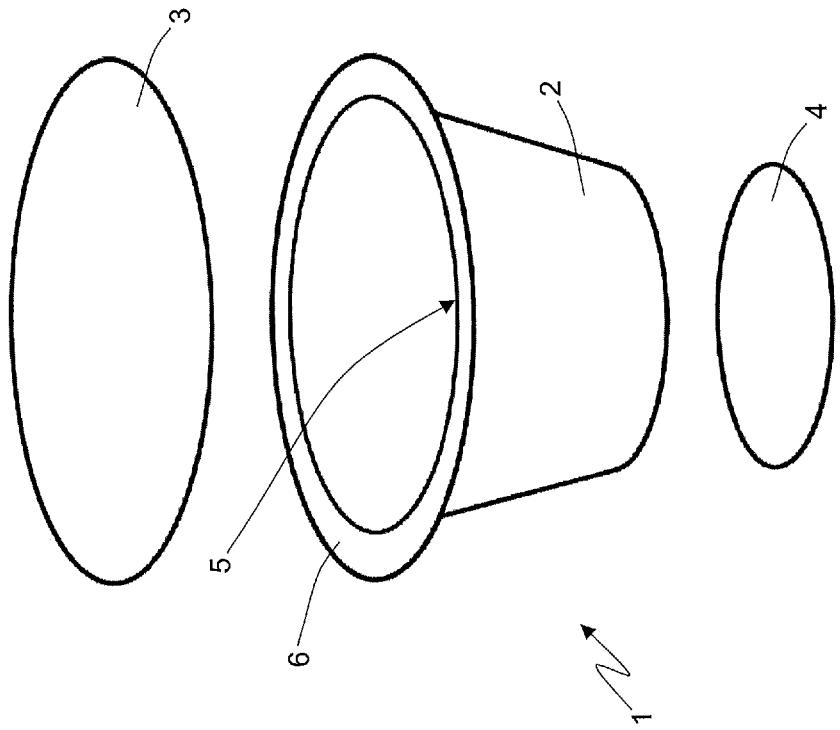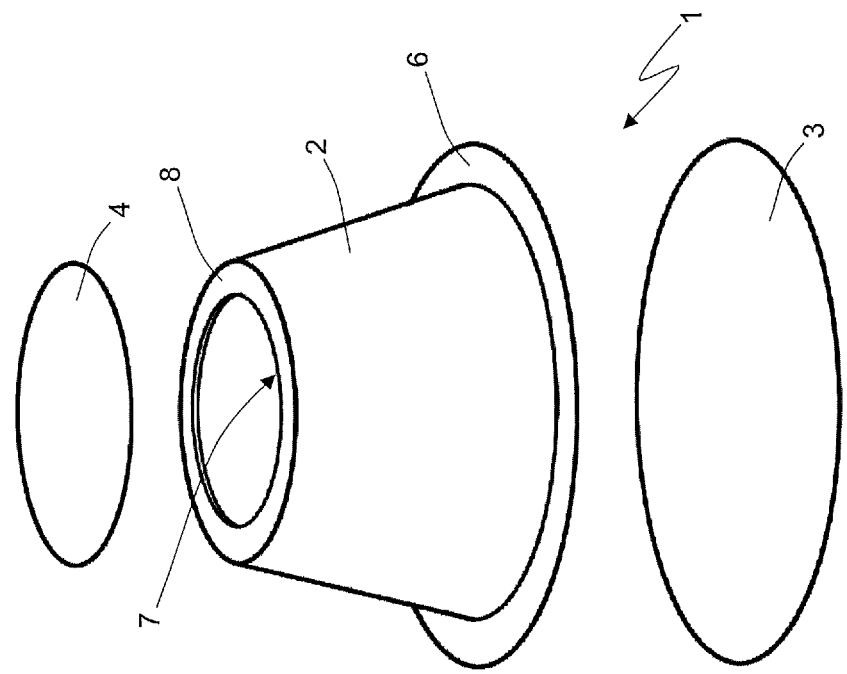

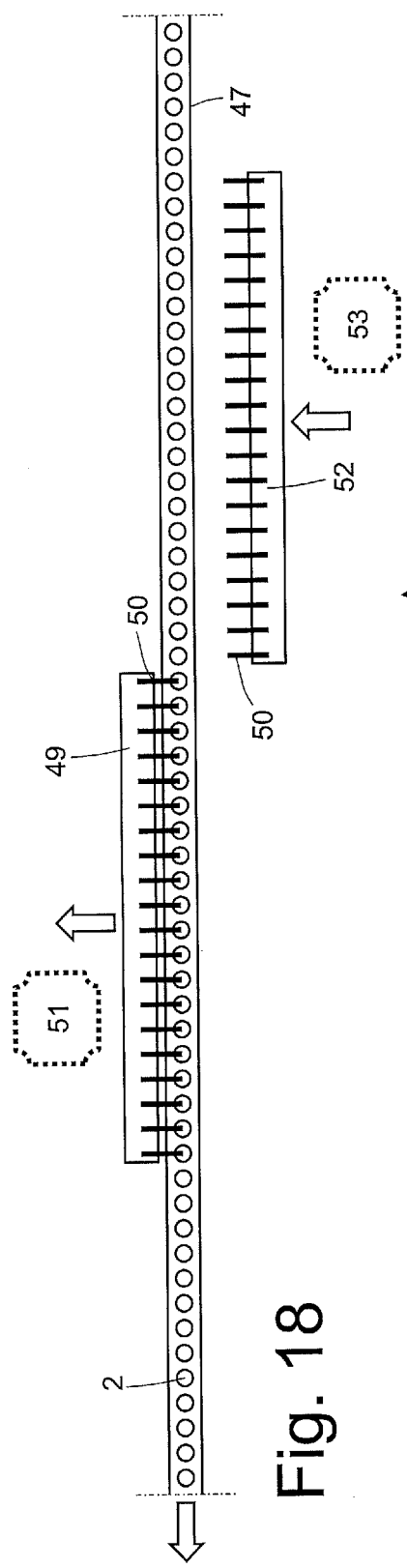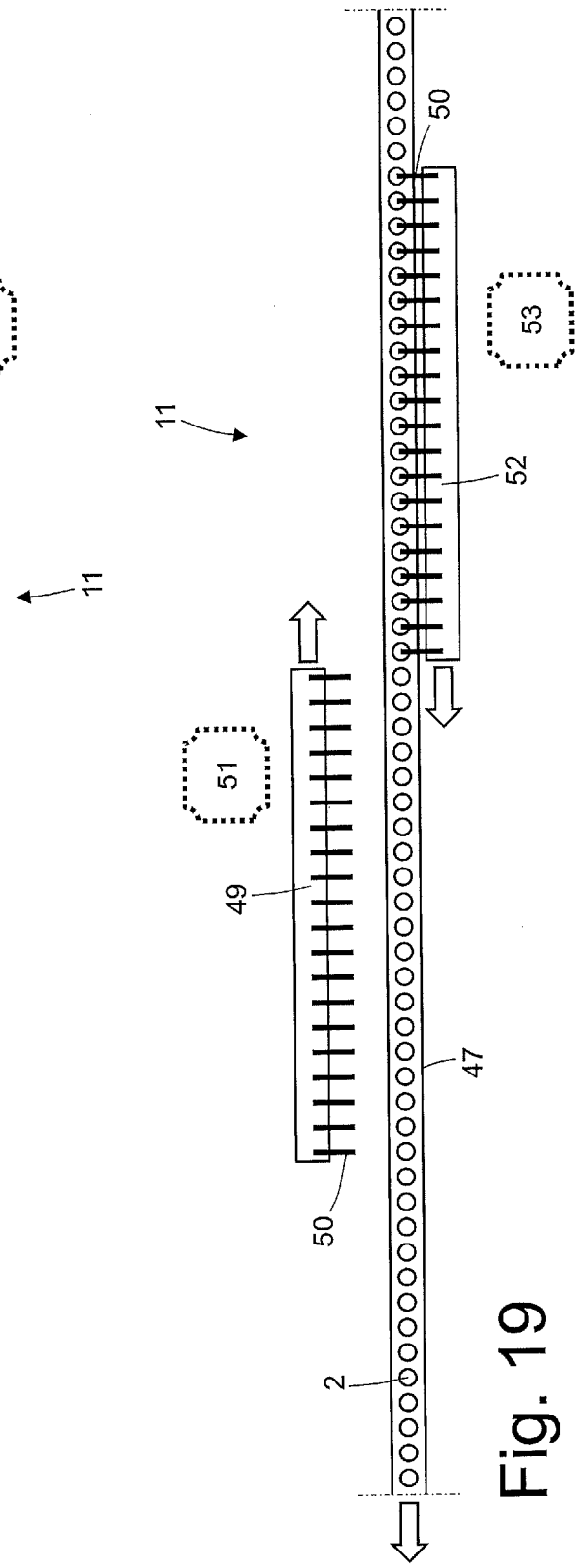

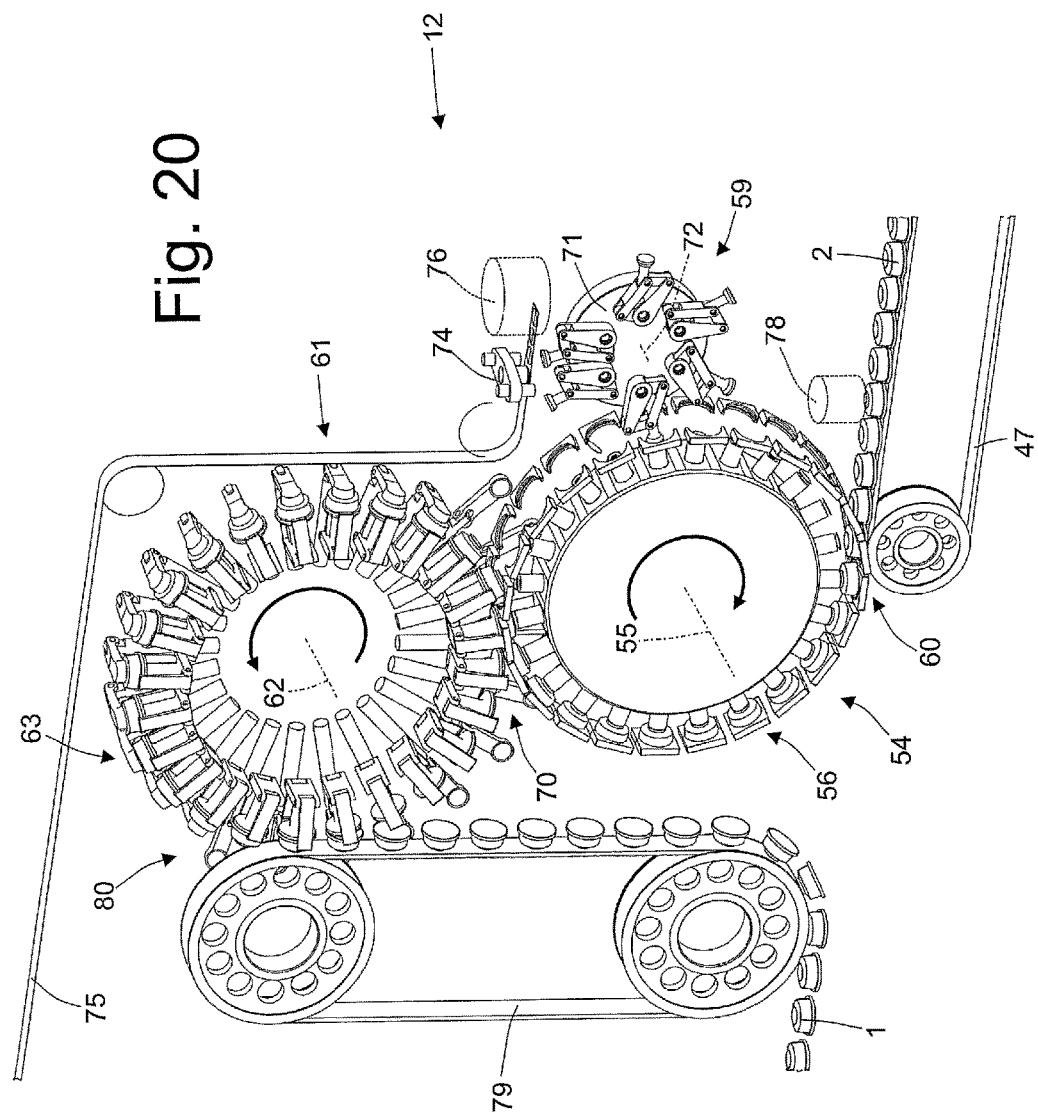

APPLICATION UNIT AND METHOD FOR APPLYING A WALL TO A HOLLOW BODY IN A MANUFACTURING PROCESS FOR PRODUCING A BEVERAGE CAPSULE

CROSS-REFERENCE TO RELATED APPLICATIONS

This is the U.S. national phase of International Application No. PCT/EP2015/051089, filed Feb. 13, 2015, which claims the benefit of Italian Patent Application No. B02014A000070, filed Feb. 13, 2014.

TECHNOLOGY FIELD

The present invention relates to a machine and to a method for applying a wall to a hollow body in a manufacturing process for producing a beverage capsule.

The present invention is suited for advantageous application in the production of coffee capsules, to which the following description will make explicit reference without thereby losing generality.

PRIOR ART

A coffee capsule comprises a hollow body of a flared shape (i.e., having a frusto-conical shaped cross section), which contains a dose of coffee powder, is closed at the bottom by a disc-shaped bottom wall, and is closed at the top by a disc-shaped top wall. In use at least one of the bottom and top walls is perforated to feed hot water under pressure inside the capsule which by mixing with the coffee powder produces coffee.

Recently, to simplify the production of the hollow body it has been proposed to produce the hollow body initially devoid of both the bottom wall and the top wall, and then to apply both bottom and top walls to the hollow body during the production of the capsule (examples of said capsule are provided in patent applications EP1892199A1 and EP2465792A2). In particular, a bottom or top wall is applied to the hollow body before filling the hollow body with the coffee powder, while the other top or bottom wall is applied to the hollow body after filling the hollow body with the coffee powder. However, the production of capsules wherein the hollow body is initially devoid of both the bottom wall and the top wall is currently produced by inefficient packaging machines (i.e. slow, that is, having low productivity) and ineffective (i.e. not able to guarantee a high quality final product).

In FIG. 6 of the patent application FR2229612A1, an application unit for applying a wall O to a hollow body FD is illustrated, and comprising: a sealing conveyor 83 which advances along a sealing path; a plurality of sealing heads 87, each of which is carried by the sealing conveyor 83 and supports a gripping device 88 for gripping the wall O; a feeding conveyor 2 (better illustrated in FIG. 2) which is defined by two opposing conveyor belts 3a and 3b and supports a plurality of seats 10 (each defined by two shells 10a and 10b coupled to each other and conveyed by corresponding conveyor belts 3a and 3b) suited to bring the hollow bodies FD; a first feed station 25 for feeding each wall O to the corresponding sealing head 87, so that the wall O is gripped by the gripping device 88; and a second feed station 21 for feeding each hollow body FD to the corresponding seat 10. Each sealing head 87 comprises a sealing member (described implicitly) that together with the sealing head 87 is movable between a rest position in which the sealing member is detached from the hollow body FD carried by the corresponding seat 10 and a work position in which the sealing element presses against the hollow body FD carried by the corresponding seat 10. It is important to note that in the patent application FR2229612A1 each sealing head 87 does not support in any way the hollow body FD which is instead housed in a corresponding seat 10 of another conveyor 2; furthermore, each sealing head 87 comprises a positioning rib 75 that in use is inserted in a slot 49a, 49b of a corresponding seat 10 which carries the hollow body FD to ensure a correct coupling between the sealing head 87 and the seat 10. Even the application unit described in patent application FR2229612A1 is not very efficient (i.e. is slow, having low productivity) and is not very effective (i.e. is not able to ensure a high quality final product).

DESCRIPTION OF THE INVENTION

The object of the present invention is to provide an application unit and a method for applying a wall to a hollow body in a production process of a beverage capsule, which machine and method allow to reach high productivity levels, and are, at the same time, easy and inexpensive to manufacture.

According to the present invention, an application unit and method for applying a wall to a hollow body in a production process of a beverage capsule are provided, as claimed in the appended claims.

BRIEF DESCRIPTION OF THE DRAWINGS

The present invention will now be described with reference to the accompanying drawings, which illustrate a non-limitative embodiment, wherein:

FIGS. 1 and 2 are two different perspective and exploded views of a beverage capsule;

FIGS. 16-19 are four schematic plan views of a filling unit of the packaging machine of FIGS. 3 and 4;

FIG. 20 is a schematic perspective view of an application unit of a bottom wall of the packaging machine of FIGS. 3 and 4;

PREFERRED EMBODIMENTS OF THE INVENTION

Figure 3:
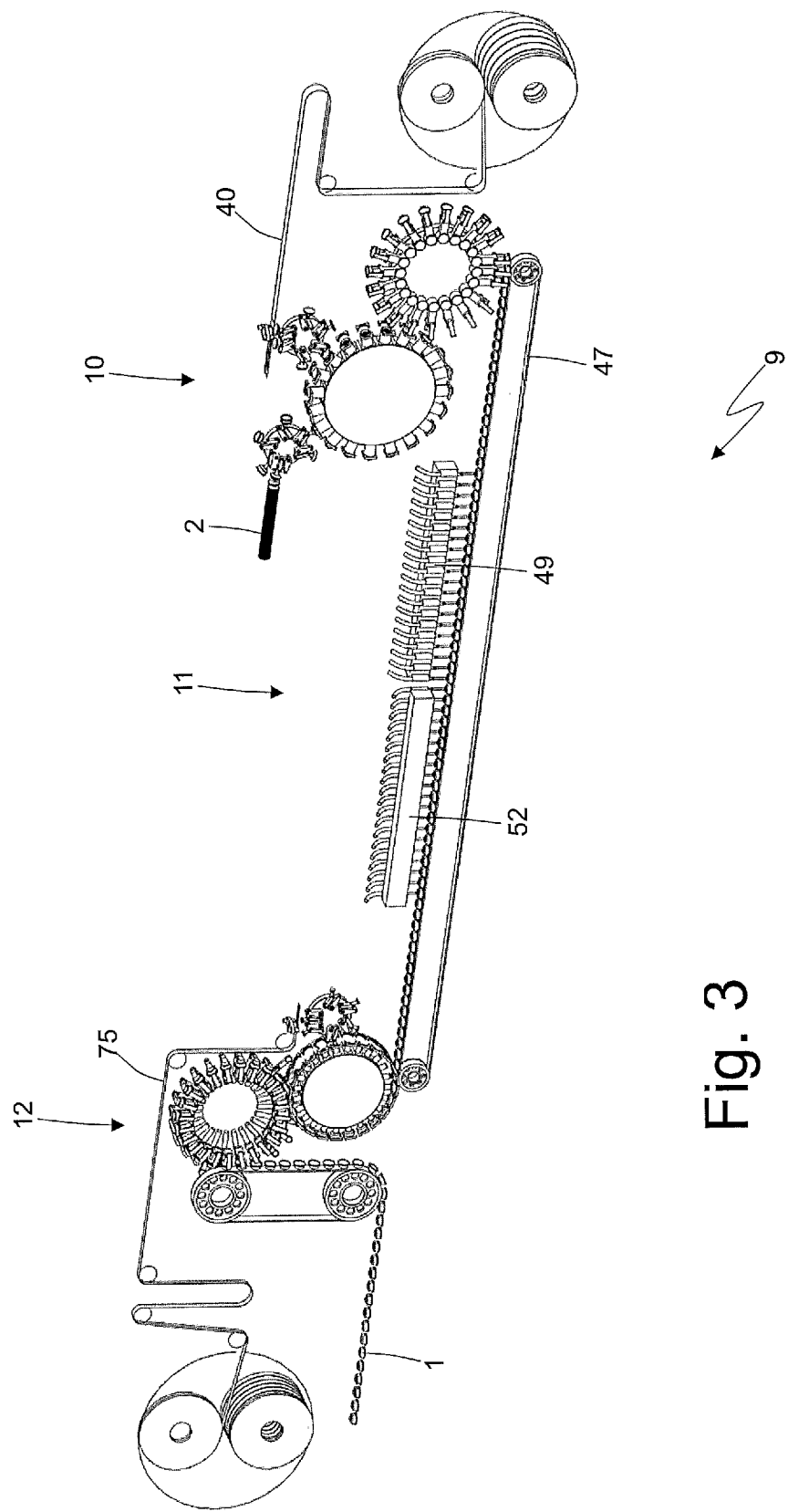
FIGS. 3 and 4 are two different perspective and schematic views of a packaging machine which is obtained according to the present invention and is suited to produce the beverage capsule of FIGS. 1 and 2.

In FIGS. 1 and 2 with the number 1 indicates as a whole a disposable (i.e. single-use) beverage capsule. The capsule 1 comprises a hollow body 2 which contains a dose of product for preparing the beverage, is closed at the bottom by a disc-shaped bottom wall 3, and is closed at the top by a disc-shaped top wall 4 (and smaller than the bottom wall 3).

The product contained in the capsule 1 can be in the form of powder, granules, leaves, or even in liquid or semi-liquid form.

In the present example the capsule 1 contains coffee powder (instantaneous) or ground coffee.

The hollow body 2 has at the bottom a circular opening 5, which is surrounded by an annular edge 6 and is closed by the bottom wall 3 which rests on and is sealed to the annular edge itself, and has a top circular opening 7, which is surrounded by an annular edge 8 and is closed by the top wall 4 which rests on and is sealed to the annular edge 8 itself.

In use at least one of the bottom 3 and 4 top walls is perforated to feed pressurized hot water inside the capsule 1, that by mixing with the coffee powder, produces the coffee. The hollow body 2 is manufactured devoid both of the bottom wall 3 and of the top wall 4; both walls 3 and 4 are applied (in particular heat-sealed) to the hollow body 2 during the production of the capsule 1. In particular, the bottom wall 3 is applied (heat-sealed) to the hollow body 2 before filling the hollow body 2 with the coffee powder, while the top 4 or bottom wall is applied (heat-sealed) to the hollow body 2 after having filled the hollow body 2 with the coffee powder.

Figure 4:
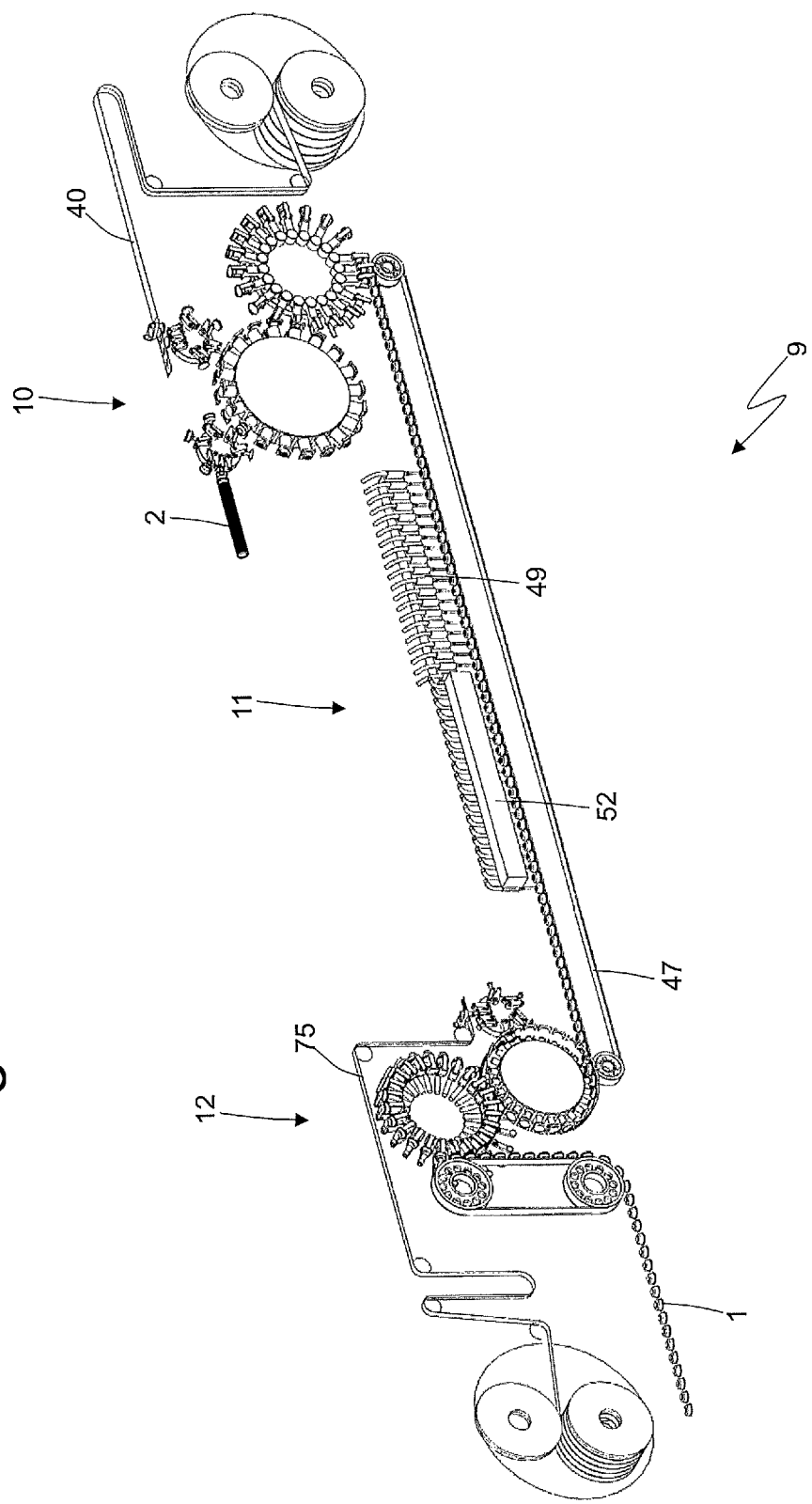
Figure 5:
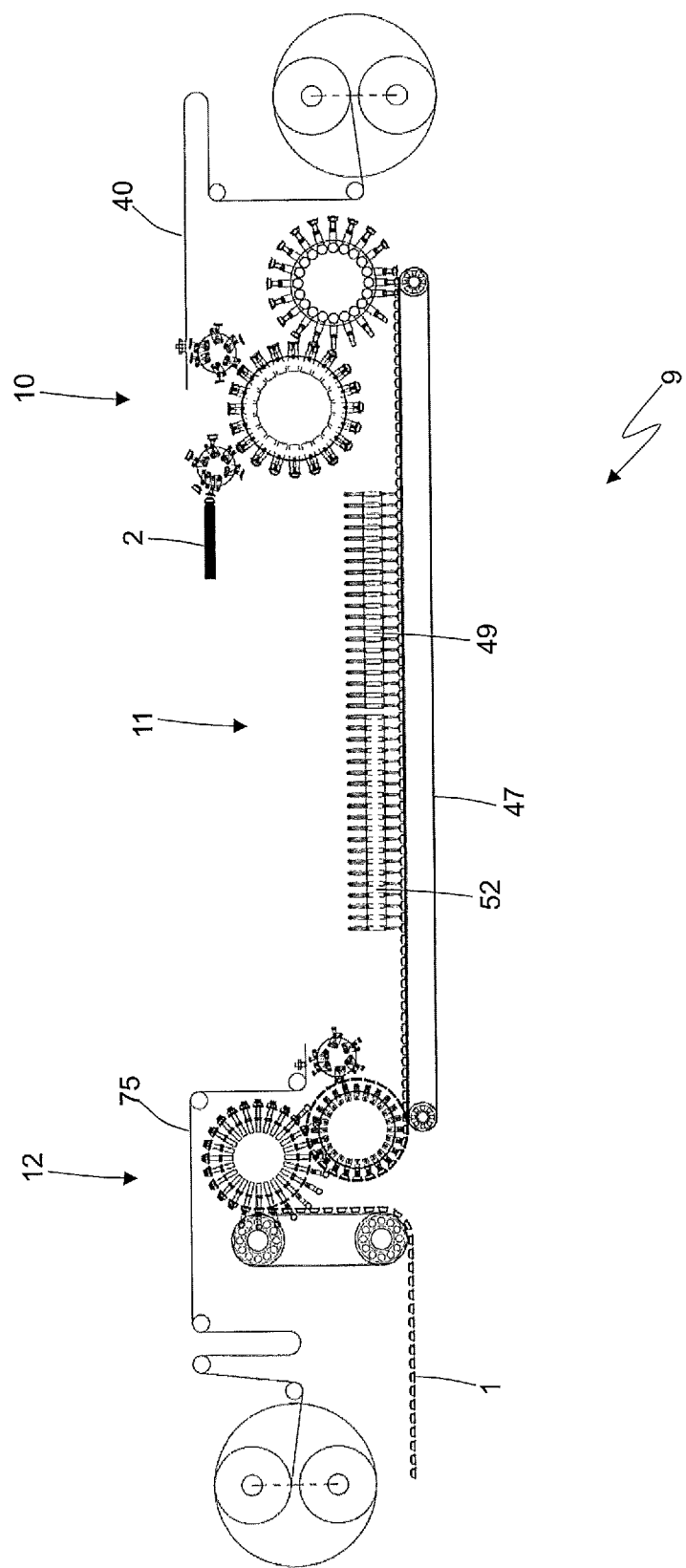
FIG. 5 is a schematic front view of the packaging machine of FIGS. 3 and 4.

In FIGS. 3, 4 and 5 number 9 indicates as a whole a packaging machine for the production of the coffee capsules 1.

As shown in FIGS. 3, 4 and 5, the packaging machine 9 comprises an application unit 10 in which each hollow body 2 is applied to the corresponding bottom wall 3, a filling unit 11 in which each hollow body 2 a corresponding amount of product (i.e. coffee powder) is fed, and an application unit 12 in which each hollow body 2 is applied to the corresponding top wall 4.

Figure 6:
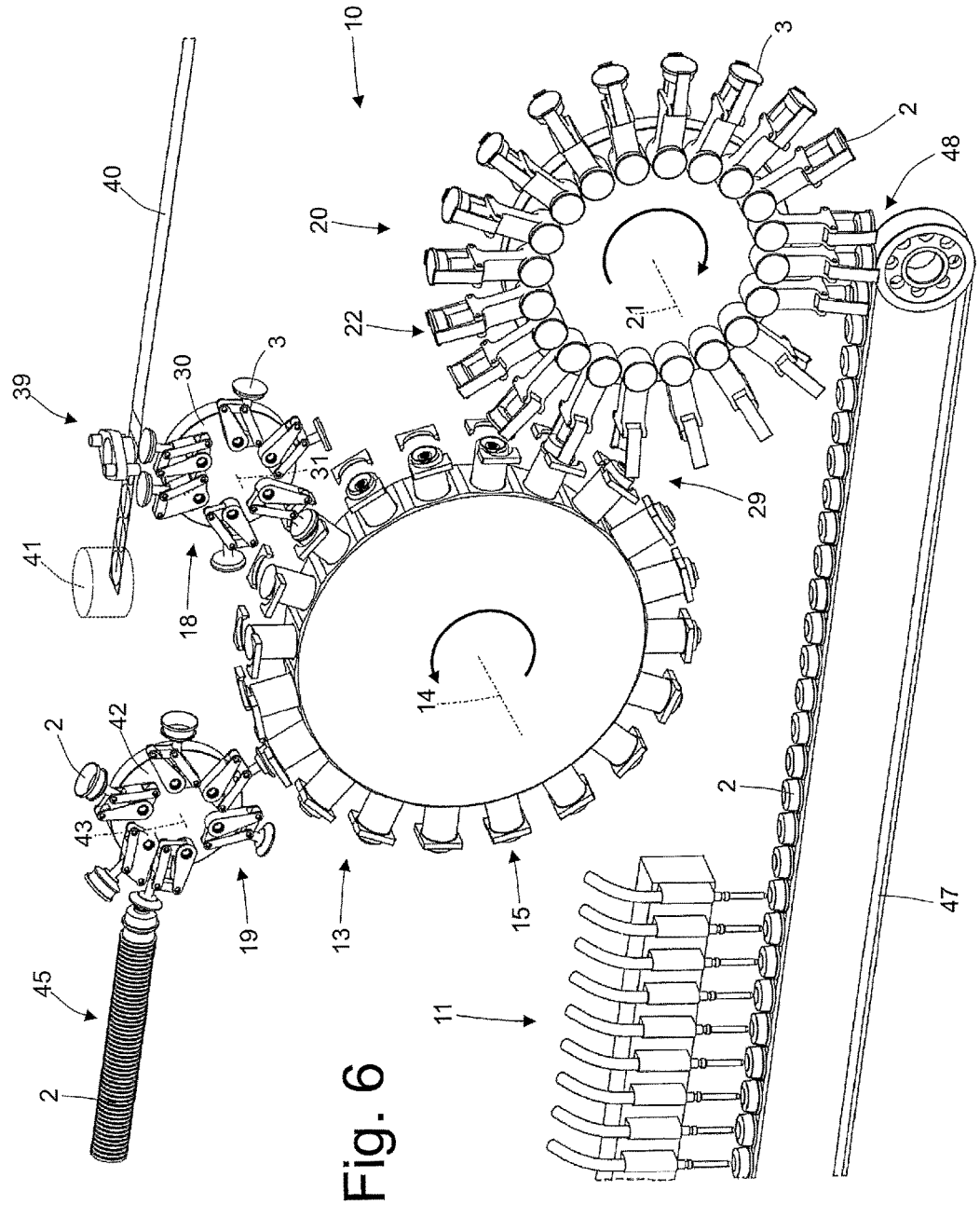
FIG. 6 is a schematic perspective view of an application unit of a top wall of the packaging machine of FIGS. 3 and 4.
Figure 9:
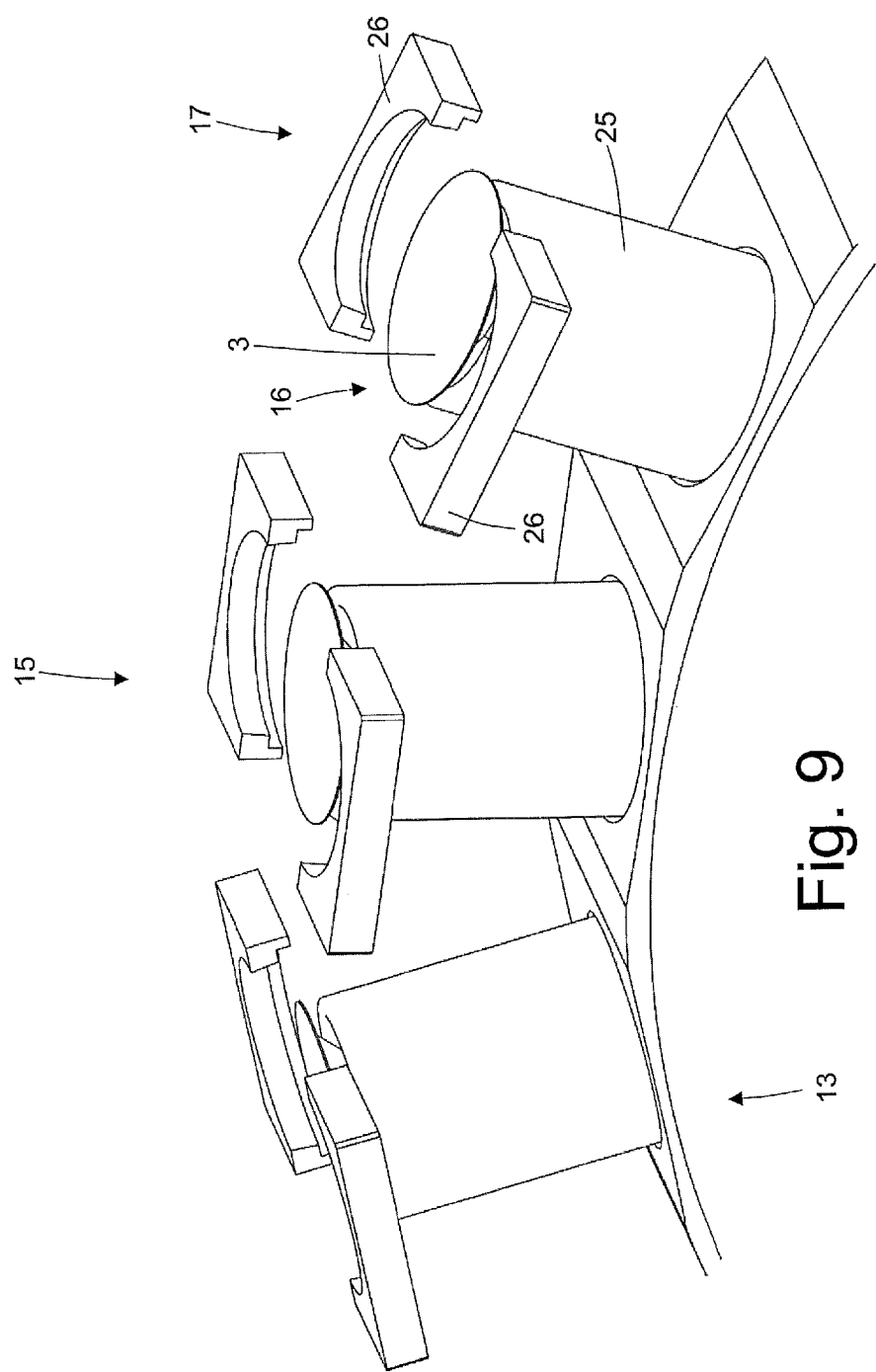
FIG. 9 is a schematic perspective view of part of a sealing wheel of the application unit of FIG. 6.
Figure 10:
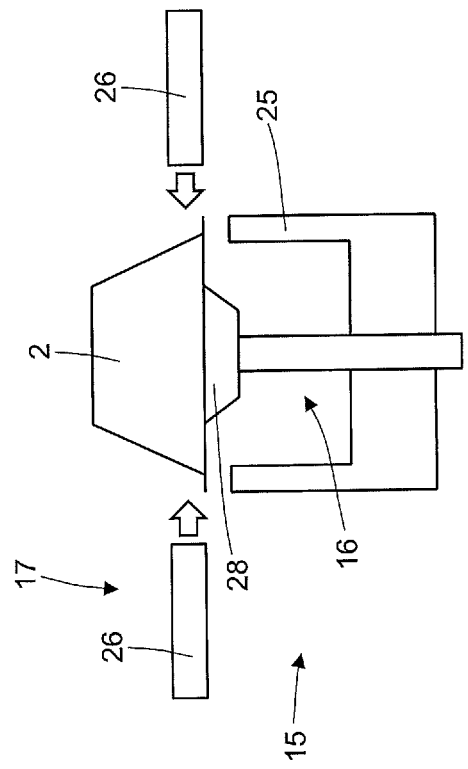
FIGS. 10-13 are four schematic front views of a sealing head of the sealing wheel of FIG. 9 in four different operating steps.
Figure 11:
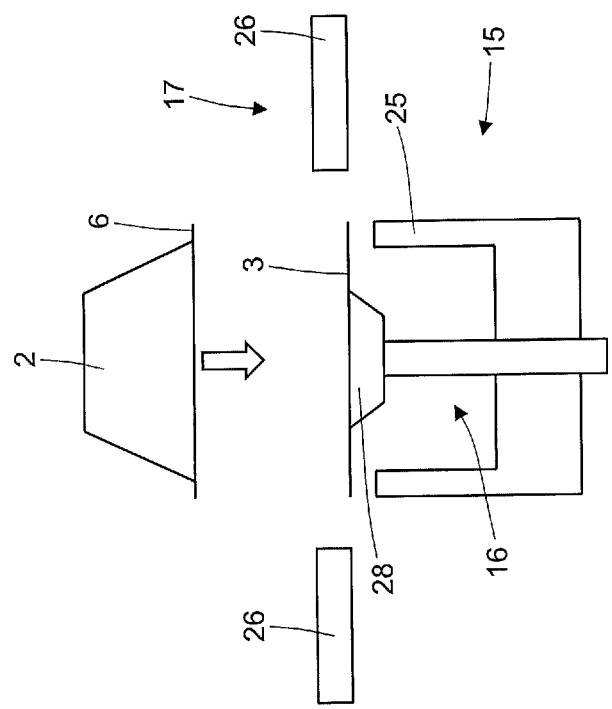

As shown in FIG. 6, the application unit 10 comprises a sealing wheel 13 which is arranged vertically, is rotatably mounted about a horizontal rotation axis 14 and is suited to turn with continuous motion (i.e. with constant speed) about the rotation axis 14 itself to advance cyclically along a circular sealing path. The sealing wheel 13 supports a plurality of sealing heads 15, each of which is suited to receive a corresponding bottom wall 3 and a corresponding hollow body 2 for coupling and sealing the bottom wall 3 to the hollow body 2. As shown in FIG. 9, each sealing head 15 supports a gripping device 16 for gripping the bottom wall 3 and a retaining device 17 suited to retain the hollow body 2.

As shown in FIG. 6, the application unit 10 comprises a feed station 18, which is arranged near the sealing wheel 13 for successively feeding the bottom walls 3 to the corresponding sealing heads 15 so that each bottom wall 3 is gripped by the gripping device 16 of the corresponding sealing heads 15. The application unit 10 also comprises a feed station 19, which is arranged in the vicinity of the sealing wheel 13 downstream from the feed station 18 along the sealing path for successively feeding the hollow members 2 to the corresponding sealing heads 15 so that each hollow body 2 is coupled to the corresponding bottom wall 3 gripped by the gripping device 16 and is retained by the retaining device 17 of the corresponding sealing head 15.

Figure 15:
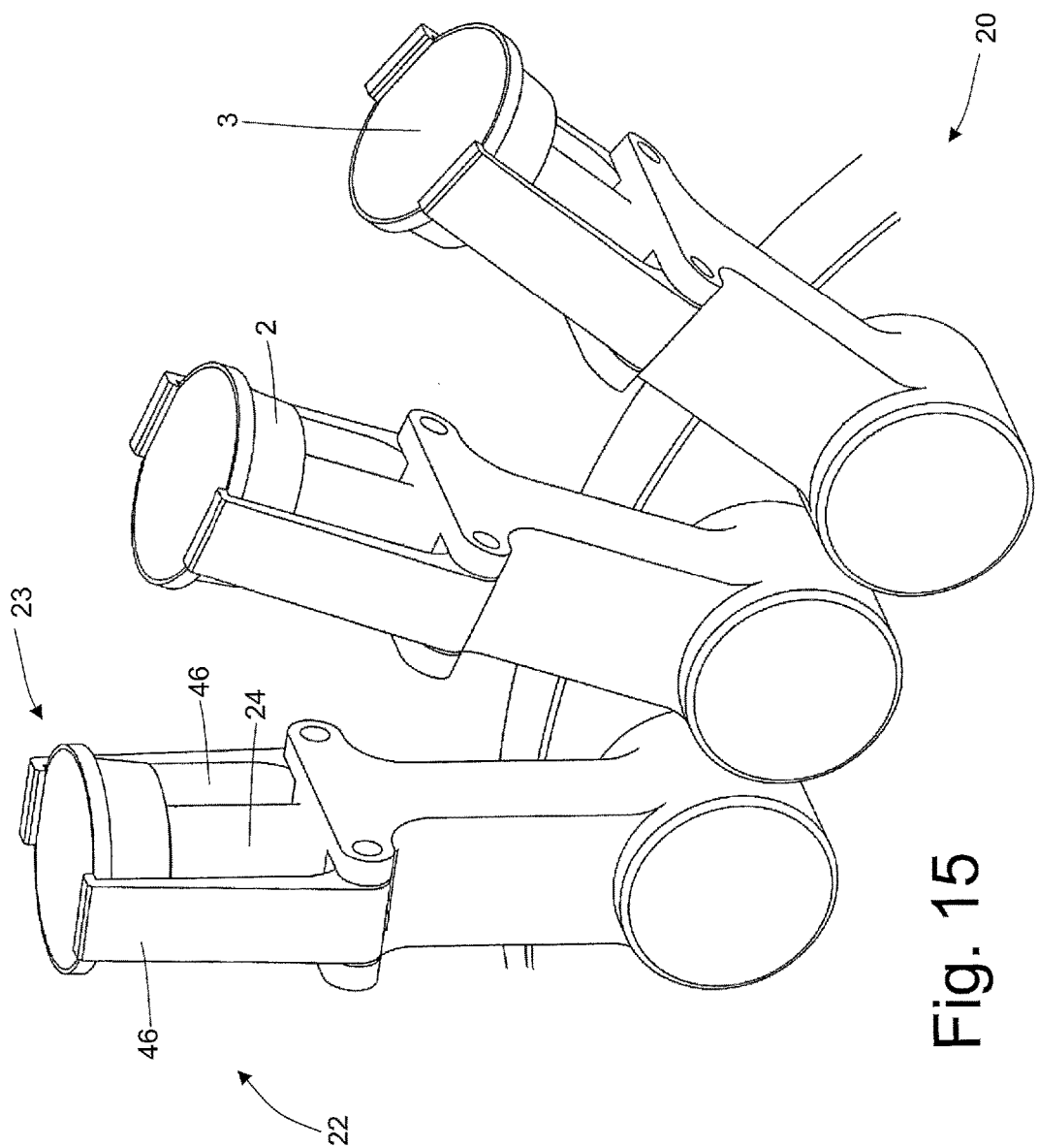
FIG. 15 is a schematic perspective view of part of a control wheel of the application unit of FIG. 6.
Figure 16:
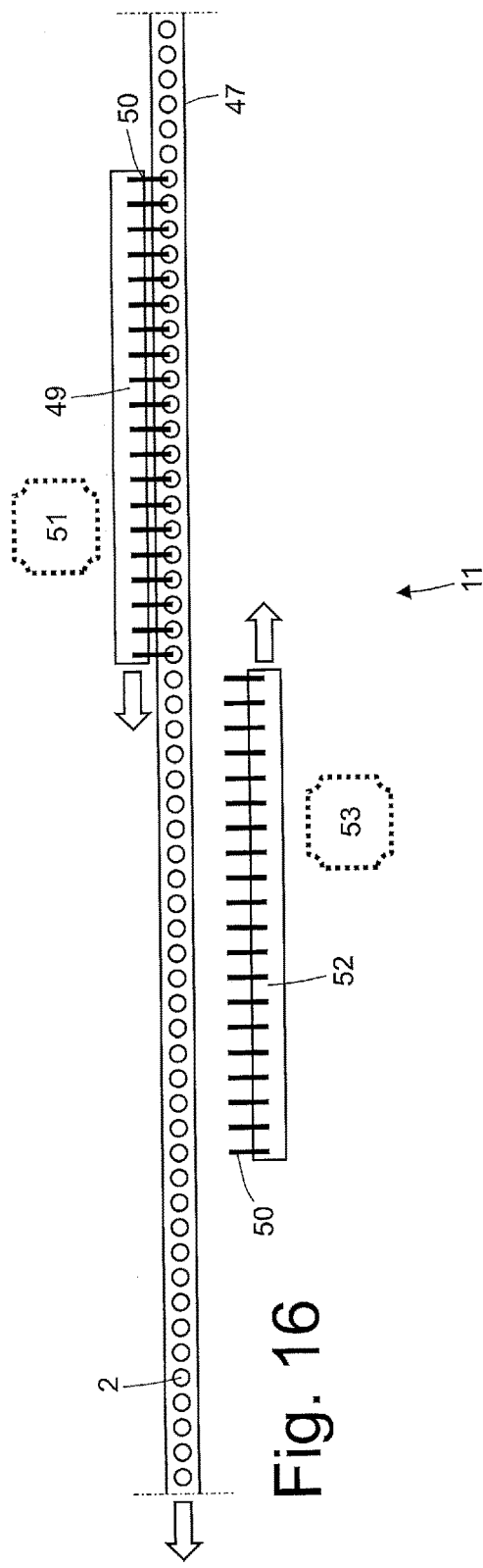

The application unit 10 comprises a control wheel 20 which is vertically arranged, is rotatably mounted about a horizontal rotation axis 21 (and parallel to the rotation axis 14) and is suited to turn with continuous motion (i.e. with constant speed) about the rotation axis 21 itself to advance cyclically along a circular control path. The control wheel 20 is arranged immediately downstream from the sealing wheel 13 and receives in succession from the sealing wheel 13 itself the hollow bodies 2 of the corresponding bottom wall 3; the function of the control wheel 20 is to check the tightness (leak-proof) of the seal between each hollow body 2 and the corresponding bottom wall 3. As shown in FIG. 15, the control wheel 20 supports a plurality of control heads 22, each of which comprises a retaining device 23 for retaining the corresponding hollow body 2 and a control member 24 which is suited to couple the hollow body 2 to check the tightness of the seal between the hollow body 2 and the bottom wall 3.

According to a preferred embodiment, each control head 22 is hinged to the control wheel 20 to rotate with respect to the control wheel 20 itself about a rotation axis parallel to and spaced from the rotation axis 21; the respective movement between each control head 22 and the control wheel 20 allows to confer to the control head 22 a particular orientation in the instants in which the control head 22 receives or transfers the corresponding hollow body 2.

As illustrated in FIGS. 9-13, each sealing head 15 comprises a sealing member 25, which has an annular shape, surrounding the gripping device 16, and is movable radially (i.e. perpendicular to the rotation axis 14) between a rest position (shown in FIGS. 9-12) in which the sealing member 25 detached from the bottom wall 3 is gripped by the gripping device 16 and a work position (illustrated in FIG. 13) in which the sealing member 25 contacts the bottom wall 3 gripped by the gripping device 16 from the opposite side with respect to the hollow body 2 (in other words, the bottom wall 3 is located in the middle between the hollow body 2 on one side and the sealing member 25 on the other). Preferably, each sealing member 25 is moved radially (as described above) by the movement generated by a linear electric motor of the "voice coil" type; thanks to the use of said linear electric motor it is possible to control with extreme precision both the position of the sealing member 25 and the thrust (pressure) that the sealing member 25 exerts during sealing. In this way, it is possible to adjust the thrust (pressure) that the sealing member 25 exerts during sealing to adapt the thrust (pressure) to the type of material to be sealed. The sealing member 25 is constantly heated by a heater embedded in the inside thereof (typically one or more heat-resistors) to be always maintained at a predetermined sealing temperature (in general dependent on the type of material to be sealed, and, possibly, on the effective working speed of the packaging machine 9).

Figure 13:
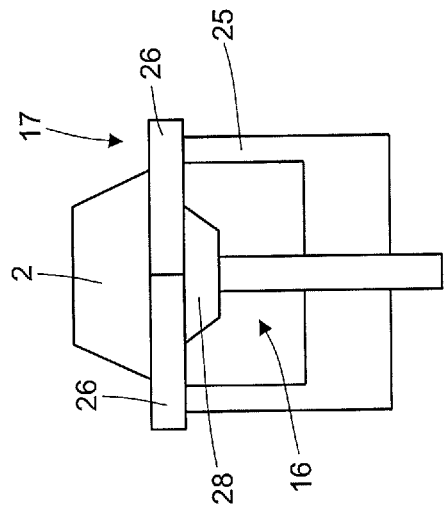
Figure 12:
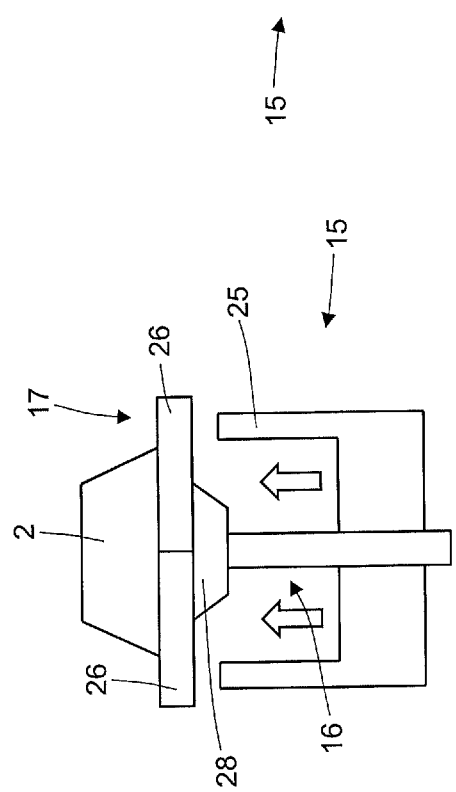
Figure 14:
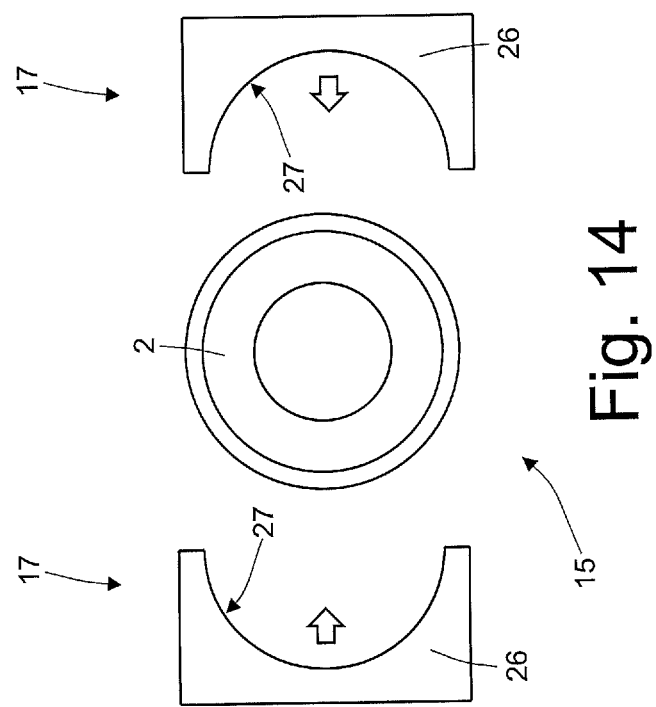
FIG. 14 is a view and plan view of a sealing head of the sealing wheel of FIG. 9.

According to a preferred embodiment, the retaining device 17 is arranged at the sealing member 25 the from the opposite side with respect to the bottom wall 3 so that the bottom wall 3 and the corresponding portion of the hollow body 2 are gripped between the sealing member 25 and the retaining device 17 when the sealing member 25 is moved into the work position (illustrated in FIG. 13).

According to a preferred embodiment, the retaining device 17 comprises two jaws 26 movable one with respect to the other between a rest position (shown in FIGS. 9-11 and 14) in which the two jaws 26 are apart from each other allowing the hollow body 2 to move radially with respect to the sealing head 15 and a retaining position (shown in FIGS. 12 and 13) in which the two jaws 26 are close to each other and engage the hollow body 2 by preventing the hollow body 2 itself to move with respect to the sealing head 15. In other words, the two jaws 26 of each retaining device 17 act as a clamp for clamping in between a corresponding hollow body 2. Each jaw 26 has a central semi-circular cavity 27 which reproduces in negative the shape of the hollow body 2, so as to tighten without appreciably deforming the hollow body 2 itself.

According to a preferred embodiment illustrated in FIGS. 10-13, each gripping device 16 comprises a suction cup element 28 (rigid or at least partly elastic) connectable with a suction source; obviously when and only when it is necessary to retain a bottom wall 3, by means of the suction cup element 28 of the corresponding retaining device 16 when the suction is activated.

The two jaws 26 are movable one with respect to the another on a plane parallel to the lying plane of the suction cup element 28 of the gripping device 16.

Preferably, the respective approach and departure movement of the jaws 26 is a translational movement on the plane mentioned above.

In the following example the application of a bottom wall 3 to a corresponding hollow body 2 with reference to that illustrated in FIGS. 9-13 is described.

Initially, a corresponding sealing head 15 due to the continuous movement of the sealing wheel 13 passes through the feed station 18 from which receives the bottom wall 3; the bottom wall 3 is engaged by the gripping device 16 which grips and locks the bottom wall 3 itself (FIG. 9). Subsequently, the sealing head 15 due to the continuous movement of the sealing wheel 13 passes through the feed station 19 which receives the hollow body 2; the hollow body 2 is engaged by the retaining device 17 which grips and locks the hollow body 2 itself (FIGS. 10, 11 and 12) by moving the jaws 26 from the inactive position (shown in FIGS. 10 and 11) to the retaining position (shown in FIG. 12).

At this point, while the sealing head 15 continues to move along the sealing path due to the continuous movement of the sealing wheel 13, the sealing member 25 is moved from the rest position (illustrated in FIGS. 9-12) to the work position (illustrated in FIG. 13) to perform an annular seal between the edge of the bottom wall 3 and the edge 6 of the hollow body 2; in particular, the edge of the bottom wall 3 and the edge 6 of the hollow body 2 are clamped on one side by the sealing member 25 and on the opposite side by the retaining device 17 which acts as a contrast to the sealing member 25 (which can then exert high pressure that promotes and accelerates the performance of the heat sealing).

Once the sealing between the bottom wall 3 and the hollow body is completed, the sealing member 25 is taken back in the rest position (illustrated in FIGS. 9-12) moving away from the bottom wall 3 and the hollow body 2 provided with the bottom wall 3 is transferred from the sealing head 15 of the sealing wheel 13 to a corresponding control head 22 of the control wheel 20 in a transfer station 29 (illustrated in FIG. 6) defined between the two wheels 13 and 20. Obviously, at the transfer station 29 both the gripping device 16 and the retaining device 17 respectively free the bottom wall 3 and the hollow body 2 to allow the transfer thereof from the sealing head 15 of the sealing wheel 13 to a corresponding control head 22 of the control wheel 20; in particular, at the transfer station 29 the gripping device 16 stops the suction by means of the suction cup element 28, while at the transfer station 29 the retaining device 17 moves the jaws 26 in the inactive position (illustrated in FIGS. 9-11 and 14).

In summary, in use each sealing member 25 is maintained in the rest position (illustrated in FIGS. 9-12) at the feed stations 18 and 19 and is moved into the work position (illustrated in FIG. 13) downstream from the feed station 19. Moreover, the jaws 26 of the retaining device 17 are moved into the rest position (illustrated in FIGS. 9-11 and 14) as the hollow body 2 enters and exits the sealing head 15 and are moved to the retaining position (illustrated in FIGS. 12 and 13) when the hollow body 2 is housed in the sealing head 15.

Figure 7:
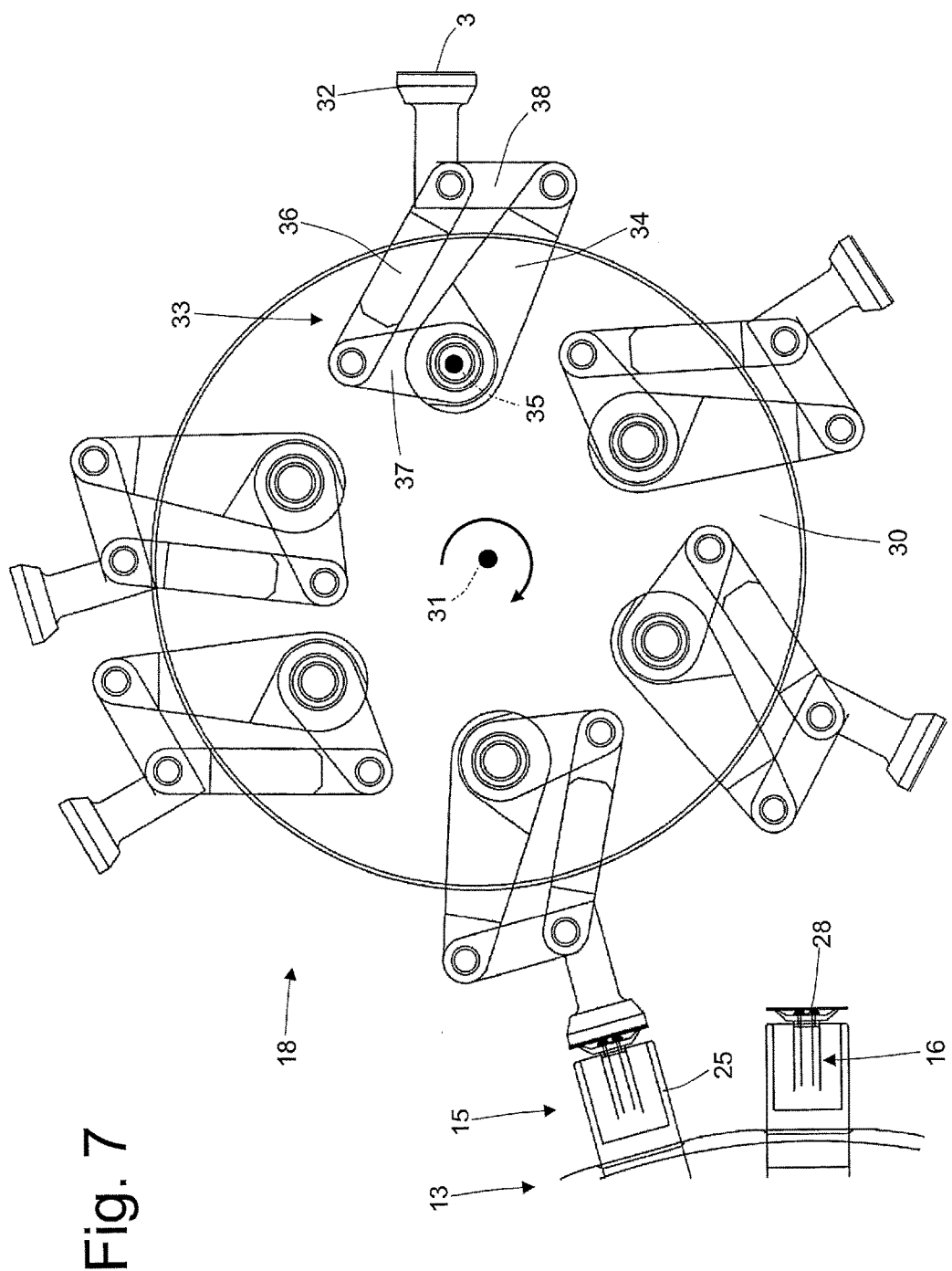
FIG. 7 is a schematic front view of a first feed station of the application unit of FIG. 6.

As shown in FIG. 7, the feed station 18 comprises a feed wheel 30, which is arranged vertically, is rotatably mounted about a horizontal rotation axis 31 (and parallel to the rotation axis 14) and is suited to turn with continuous motion (or with constant speed) about the rotation axis 31 itself to cyclically advance along a circular feed path. The feed wheel 30 supports an assembly of suction gripping heads 32, each of which is suited to retain a corresponding bottom wall 3 and is movably mounted on the feed wheel 30, to move with respect to the feed wheel 30 itself; the respective movement between each suction gripping head 32 and the feed wheel 30 allows to confer to the suction gripping head 32 a particular orientation in the instant wherein the suction gripping head 32 receives or transfers the corresponding bottom wall 3.

According to a preferred (but not binding) embodiment illustrated in FIG. 7, each gripping head 32 is connected to the feed wheel 30 by means of the interposition of an articulated parallelogram 33 which determines the movement of suction gripping head 32 with respect to the feed wheel 30.

Each articulated parallelogram 33 comprises a rod 34 hinged at one end to the feed wheel 30 to rotate about a rotation axis parallel to the rotation axis 31, a rod 36 which is opposite and parallel to the rod 34, a rod 37 that connects the rod 34 to the rod 36 at the end of the rod 34 hinged to the feed wheel 30, and a rod 38 ("L" shaped) that is parallel and opposite to the rod 37 and supports the suction gripping head 32.

As illustrated in FIG. 6, the feed station 18 comprises a cutting device 39, which is suited to cut in succession the bottom walls 3 off a continuous strip 40 of plastic material unwound from a spool (shown in FIGS. 1, 2 and 3). The cutting device 39 is arranged alongside the feed wheel 30 and cooperates with feed wheel 30 itself; in particular, each suction gripping head 32 is suited to rest on the continuous strip 40 of plastic material on the opposite side with respect to the cutting device 39 just before the cutting device 39 cuts the continuous strip 40 of material to separate the corresponding bottom wall 3 so as to counteract the cutting action and so as to retain the bottom wall 3 once the bottom wall 3 has been separated from the continuous strip 40 of material. According to a preferred embodiment illustrated in FIG. 6, downstream from the cutting device 39 a shredder 41 is arranged that shreds the remaining part of the continuous strip 40 of material once the bottom walls 3 have been cut off.

In use and according to that illustrated in FIG. 7, the continuous rotation of the feed wheel 30 about the rotation axis 31 brings each suction gripping head 32 to receive a corresponding bottom wall 3 of the cutting device 39 (during the receiving of the bottom wall 3, the suction gripping head 32 moves with respect to the feed wheel 30 to couple with the cutting device 39), and then subsequently to transfer the bottom wall 3 to a corresponding sealing head 15 (during the transfer of the bottom wall 3, the suction gripping head 32 moves with respect to the feed wheel 30 to couple the sealing head 15).

Figure 8:
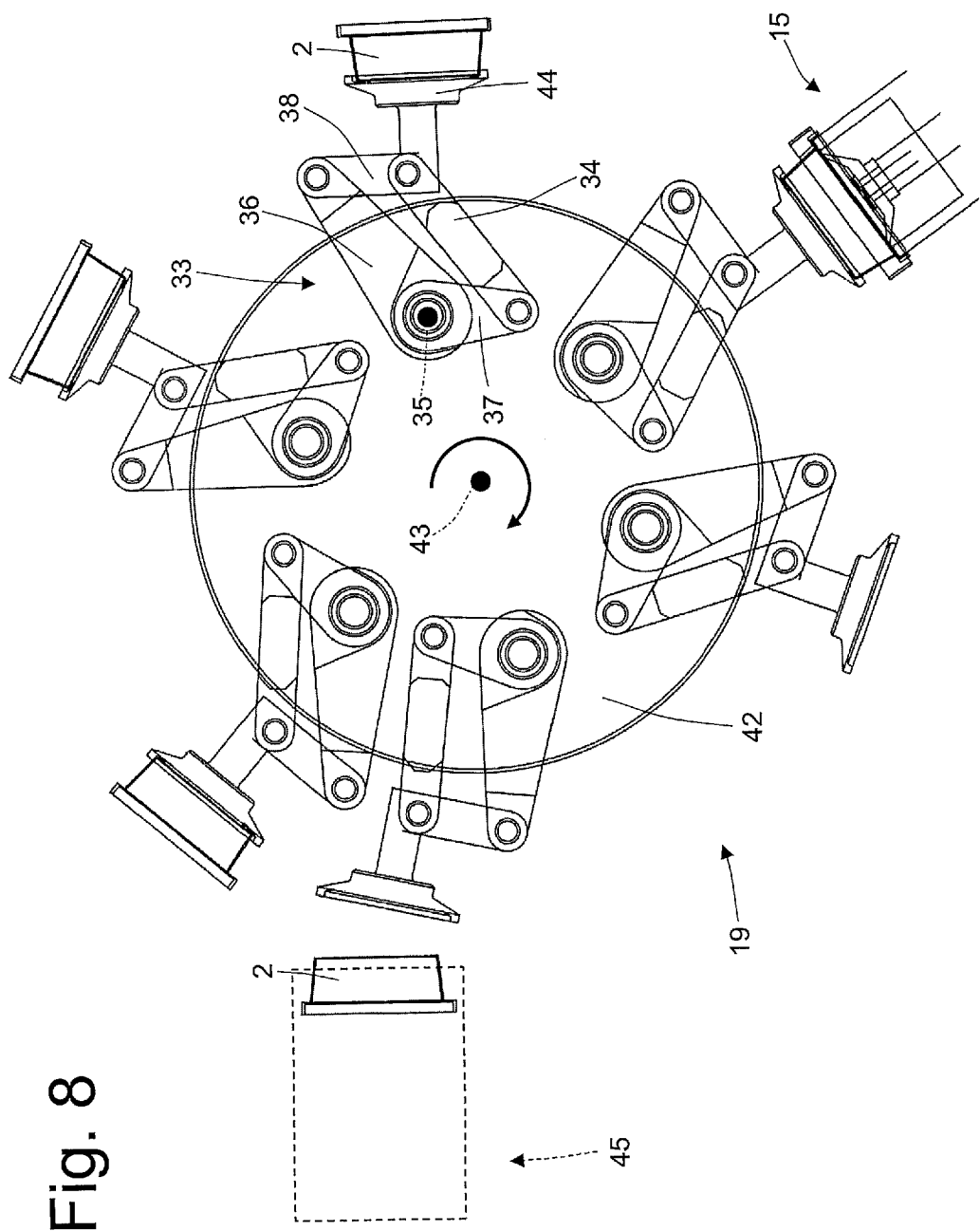
FIG. 8 is a schematic front view of a second feed station of the application unit of FIG. 6.

As illustrated in FIG. 8, the feed station 19 comprises a feed wheel 42, which is arranged vertically, is rotatably mounted about a horizontal rotation axis 43 (and parallel to the rotation axis 14) and is suited to turn with continuous motion (or with constant speed) about the rotation axis 43 itself to cyclically advance along a circular feed path. The feed wheel 42 supports an assembly of suction gripping heads 44, each of which is suited to retain a corresponding hollow body 2 and is movably mounted on the feed wheel 42 to move with respect to the feed wheel 42 itself; the respective movement between each gripping head 44 and the feed wheel 42 allows to confer the gripping head 44 a particular orientation in the instants in which the gripping head 44 receives or transfers the corresponding hollow body 2.

According to a preferred (but not binding) embodiment illustrated in FIG. 8, each gripping head 44 is connected to the feed wheel 42 by way of the interposition of an articulated parallelogram 33 (entirely similar to the articulated parallelograms of the feed wheel 30 illustrated in FIG. 7) which determines the movement of the gripping head with respect to the feed wheel 42. Each articulated parallelogram 33 comprises a rod 34 hinged at one end to the feed wheel 42 to rotate about a rotation axis 35 parallel to the rotation axis 43, a rod 36 which is parallel and opposite to the rod 34, a rod 37 that connects the rod 34 to the rod 36 at the end of the rod 34 hinged to the feed wheel 42, and a rod 38 ("L" shaped) that is parallel to and opposite to the rod 37 and supports the gripping head 44.

As illustrated in FIGS. 6 and 8, the feed station 19 comprises a hopper 45, which is oriented horizontally, is suited to accommodate a stack of hollow bodies 2, is arranged alongside the feed wheel 42 and has an outlet opening suited to be engaged in succession by the gripping heads 44 to withdraw the corresponding hollow bodies 2.

In use, the continuous rotation of the feed wheel 42 about the rotation axis 43 brings each gripping head 44 to receive a corresponding hollow body 2 from the hopper 45 (during the receiving of the hollow body 2, the gripping head 44 moves with respect to feed the wheel 42 to couple with the hopper 45), and then subsequently to transfer the hollow body 2 to a corresponding sealing head 15 (during the transfer of the hollow body 2, the gripping head 44 moves with respect to the feed wheel 42 to couple the sealing head 15).

As illustrated in FIG. 15, the retaining device 23 of each control head 22 comprises two jaws 46 movable with respect to each other between a rest position (shown in part in FIG. 6) in which the two jaws 46 are apart from each other allowing the corresponding hollow body 2 to move radially with respect to the control head 22 and a retaining position (illustrated in part in FIG. 6 and in FIG. 15) in which the two jaws 46 are close to each other and engage the hollow body 2 by preventing the corresponding hollow body 2 itself from moving with respect to the control head 22. In other words, the two jaws 46 of each retaining device 23 act as a clamp to clamp in between a corresponding hollow body 2.

In each control head 22, the cylindrical shaped control member 24 is arranged between the two jaws 46 of the retaining device 23 and is movable radially (i.e. with a linear motion oriented radially) from and to a work position (illustrated in FIG. 15) in which the control member 24 rests on the hollow body 2 on the opposite side of the bottom wall 3. In other words, when a hollow body 2 enters the corresponding control head 22 and is engaged by the jaws 46 of the retaining device 23 the control member 24 is in a rest position apart from the work position; subsequently, the control member 24 is moved into the work position to perform the control of the tightness of the seal between the bottom wall 3 and the hollow body 2 and therefore, at the end of the tightness check the control member 24 is moved back in the rest position apart from the work position to allow easy exit to the hollow body 2 from the control head 22. In the work position, each control member 24 surrounds the opening 7 of the hollow body 2 (opposite to the bottom wall 3), and then pressurizes or depressurizes the inner cavity of the hollow body 2 (which is also bounded by the bottom wall 3); in this way, it is possible to check the air tightness of the hollow body 2 (and then the bond of the heat sealing of the bottom wall 3 with the edge 5 of the hollow body 2) by testing for any changes in pressure.

As shown in FIG. 6, the filling unit 11 comprises a filling conveyor 47 that advances with continuous motion along a rectilinear filling path and supports a succession of hollow bodies 2 of the capsules 1 arranged one after the other. According to a preferred embodiment, the filling conveyor 47 is a belt and comprises a ring-closed belt wound onto two end pulleys (only one of which is illustrated in FIG. 6). The filling conveyor 47 receives in succession the hollow bodies 2 of the capsules 1 from the control wheel 20 in a transfer station 48.

In use, the continuous rotation of the control wheel 20 about the rotation axis 21 brings each control head 22 to receive a corresponding hollow body 2 from the sealing wheel 13 in the transfer station 29 (during the reception of the hollow body 2, the control head 22 moves with respect to the control wheel for coupling with a corresponding sealing head 15 of the sealing wheel 13), and then subsequently to transfer the hollow body 2 to the filling conveyor 47 in the transfer station 48 (during transfer of the hollow body 2, the control head 22 moves with respect to the control wheel 20 for coupling with the filling conveyor 47).

As illustrated in FIGS. 1-3 and 16-19, the filling unit 11 comprises a filler device 49 which is arranged on a right side of the filling conveyor 47 (with respect to the advancement direction of the filling conveyor 47 itself) and supports an assembly of fillers members 50, each of which is suited to feed a dose of product (i.e. coffee powder) inside the hollow body 2 of a corresponding capsule 1. An actuator device 51 which moves the filler device 49 parallel to the filling path with a law of motion which provides an operating step, during which the filler device 49 moves from an initial position (illustrated in FIG. 16) to a final position (illustrated in FIGS. 18 and 19) by advancing in the same direction of the filling conveyor 47 and in synchronism with the filling conveyor 47 itself so that each filler member 50 of the filler device 49 remains coupled for the whole time to the hollow body 2 of a corresponding capsule 1, and a return step, during which the filler device 49 moves from the end position (illustrated in FIGS. 18 and 19) to the initial position (illustrated in FIG. 16) advancing in the opposite direction with respect to the filling conveyor 47.

Moreover, the filling unit 11 comprises a filler device 52 which is arranged on a left side of the filling conveyor 47 (with respect to the advancement direction of the filling conveyor 47 itself) and supports an assembly of fillers members 50, each of which is suited to feed a dose of product (i.e. coffee powder) inside the hollow body 2 of a corresponding capsule 1. An actuator device 53 which moves the filler device 52 parallel to the filling path, is provided, with a law of motion which provides an operating step, during which the filler device 52 moves from an initial position (illustrated in FIGS. 18 and 19) to a final position (illustrated in FIG. 16) advancing in the same direction of the filling conveyor 47 and in synchronism with the filling conveyor 47 itself so that each filler member 50 of the filler device 52 remains coupled for the whole time to the hollow body 2 of a corresponding capsule 1, and a return step, during which the filler device 52 moves from the final position (illustrated in FIG. 16) to the initial position (illustrated in FIGS. 18 and 19) advancing in the opposite direction with respect to the filling conveyor 47. In other words, the two filler devices 49 and 52 are arranged on opposite sides of the filling conveyor 47.

According to a preferred embodiment illustrated in FIGS. 16-19, the initial position (illustrated in FIG. 16) of the filler device 49 is aligned with the initial position (illustrated in FIGS. 18 and 19) of the filler device 52 and the final position (illustrated in FIGS. 18 and 19) of the filler device 49 is aligned with the end position (illustrated in FIG. 16) of the filler device 52.

Figure 17:
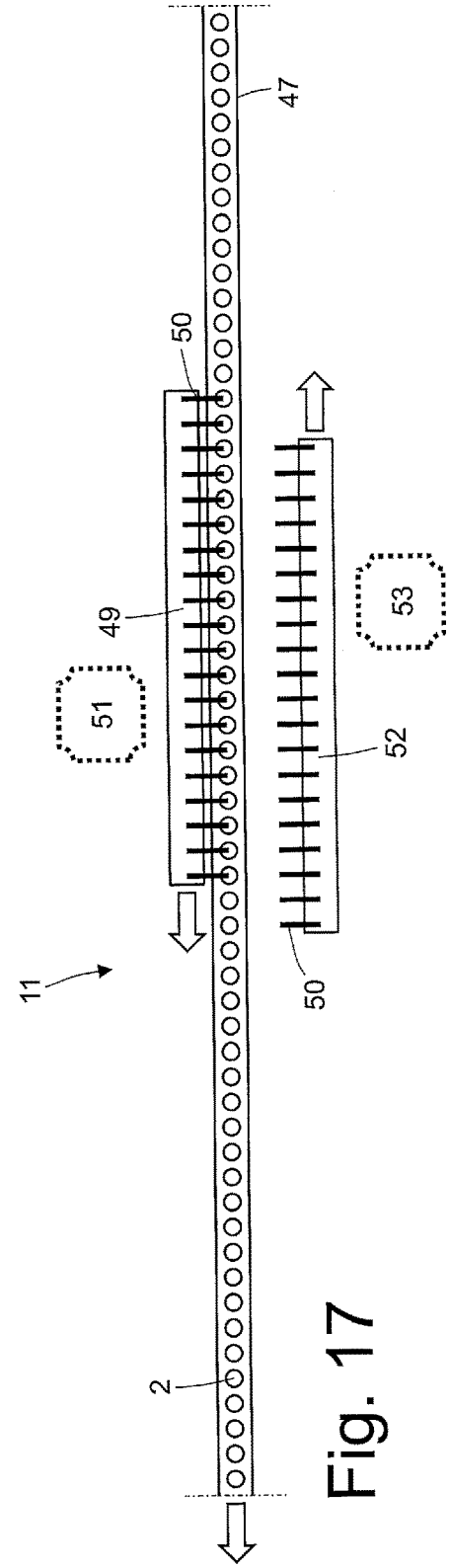

According to a preferred embodiment illustrated in FIG. 18, at the initial position each actuator device 51 or 53 moves the respective filler device 49 or 52 perpendicular to the filling path to bring the filler device 49 or 52 itself to the filling conveyor 47 so as to couple the filler members 50 of the filler device 49 or 52 to the hollow bodies 2 of corresponding capsules 1 carried by the filling conveyor 47. Similarly, at the final position each actuator device 51 or 53 moves the respective filler device 49 or 52 perpendicular to the filling path to remove the filling device 49 or 52 itself from the filling conveyor 47 so as to separate the filler members 50 of the filler device 49 or 52 from the hollow bodies 2 of corresponding capsules 1 carried by the filling conveyor 47. Said transversal displacement allows to avoid in a simple manner mechanical interference between the two filler devices 49 and 52 when the filler devices 49 and 52 themselves intersect each other (as illustrated in FIG. 17).

According to a preferred embodiment, for each actuator device or 53 (i.e. for each filler device 49 or 52) the operational step of the law of motion has the same duration as the return step of the law of motion. Furthermore, according to a preferred embodiment, the two actuator devices 51 and 53 are synchronized so the operational step of the law of motion of a filler device 49 or 52 coincides with the return step of the law of motion of another filler device 52 or 49.

In use, a filler device 49 or 52 is in the operational step of its own law of motion (thus moves from the initial position to the final position in synchronism with the filling conveyor 47 to perform the filling of an assembly of hollow bodies 2 of corresponding capsules 1 carried by the filling conveyor 47) while the other filler device 52 or 49 is in the return step of its own law of motion (thus moves from the end position to the initial position independently from the filling conveyor 47). In essence, while a filler device 49 or 52 "works" (i.e. fills an assembly of hollow bodies 2 of corresponding capsules 1 carried by the filling conveyor 47), the other filler device 52 or 49 that has completed a cycle of "work" returns to the initial position to begin a new cycle of "work". In this way in every moment the filling of an assembly of hollow bodies 2 of the corresponding capsules 1 carried by the filling conveyor 47 is performed, thus maximizing the time available.

The application unit 12 has many parts similar if not completely identical to the application unit 10 described above; consequently, the application unit 12 will now be described in less detail thus referring to that previously said about the application unit 10.

Figure 22:
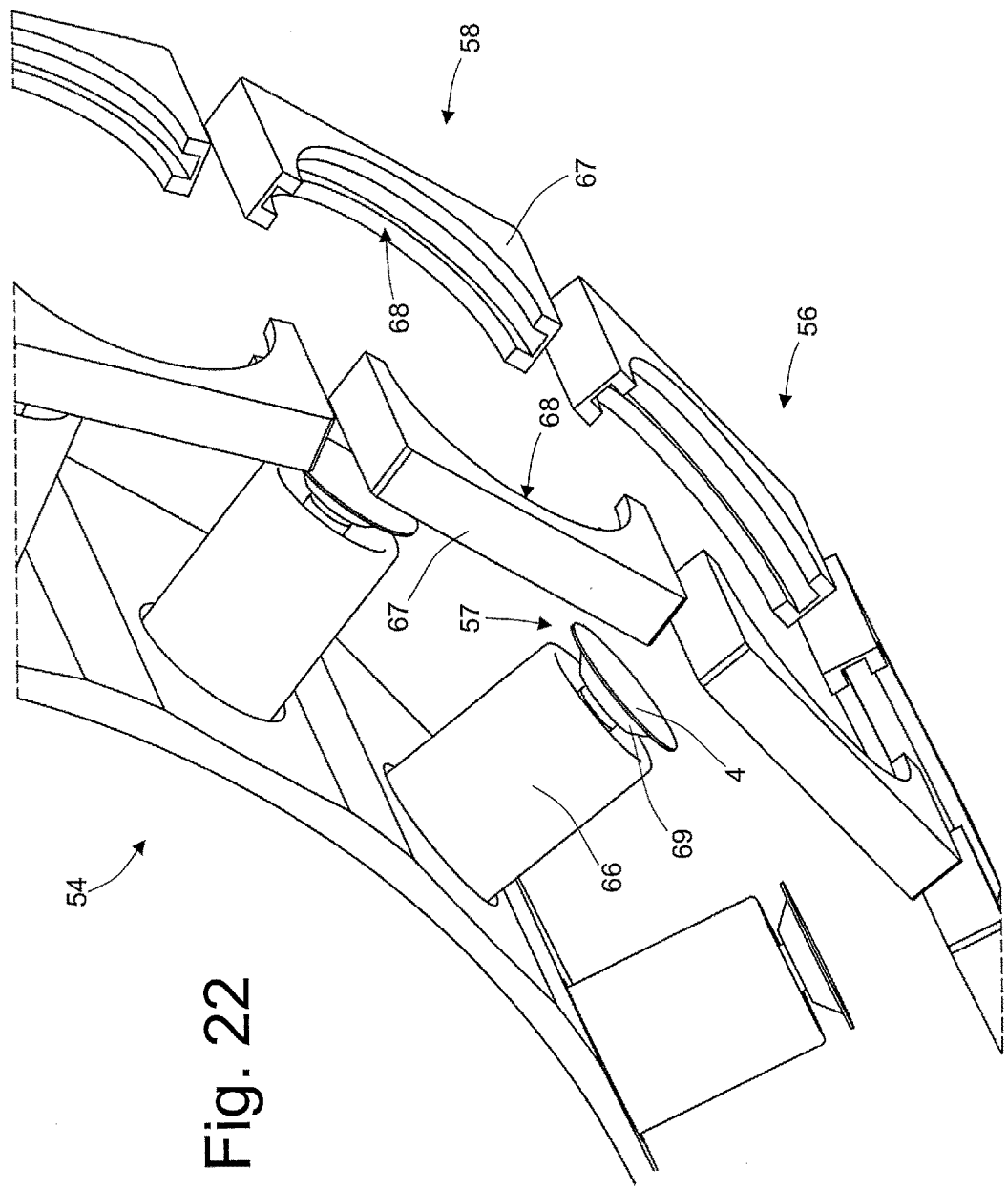
FIG. 22 is a schematic perspective view of part of a sealing wheel of the application unit of FIG. 20.

As illustrated in FIG. 20, the application unit 10 comprises a sealing wheel 54, which is arranged vertically, is rotatably mounted about a rotation axis 55 horizontal and is suited to turn with continuous motion (i.e. with constant speed) about the rotation axis 55 itself to advance cyclically along a circular sealing path. The sealing wheel 54 supports a plurality of sealing heads 56, each of which is suited to receive a corresponding top wall 4 and a corresponding hollow body 2 for coupling and sealing the top wall 4 to the hollow body 2. As illustrated in FIG. 22, each sealing head 56 supports a gripping device 57 for gripping the top wall 4 and a retaining device 58 suited to retain the hollow body 2.

As illustrated in FIG. 20, the unit 12 comprises a feed station 59, which is arranged in the vicinity of the sealing wheel 54 for successively feeding the top walls 4 to the corresponding sealing heads 56 so that each the top wall 4 is gripped by the gripping device 57 of the corresponding sealing head 56. Moreover, the application unit 12 further comprises a feed station 60, which is arranged in the vicinity of the sealing wheel 54 downstream from the feeding station 59 along the sealing path for successively feeding the hollow bodies 2 to the corresponding sealing heads 56 so that each hollow body is coupled to the corresponding top wall 4 gripped by the gripping device 57 and is retained by the retaining device 58 of the corresponding sealing head 56. In particular, in the feed station 60 the hollow bodies 2 are transferred in succession from the filling conveyor 47 to the sealing wheel 54 (i.e. the feed station 60 is constituted by a transfer station between the filling conveyor 47 and the sealing wheel 54).

Figure 23:
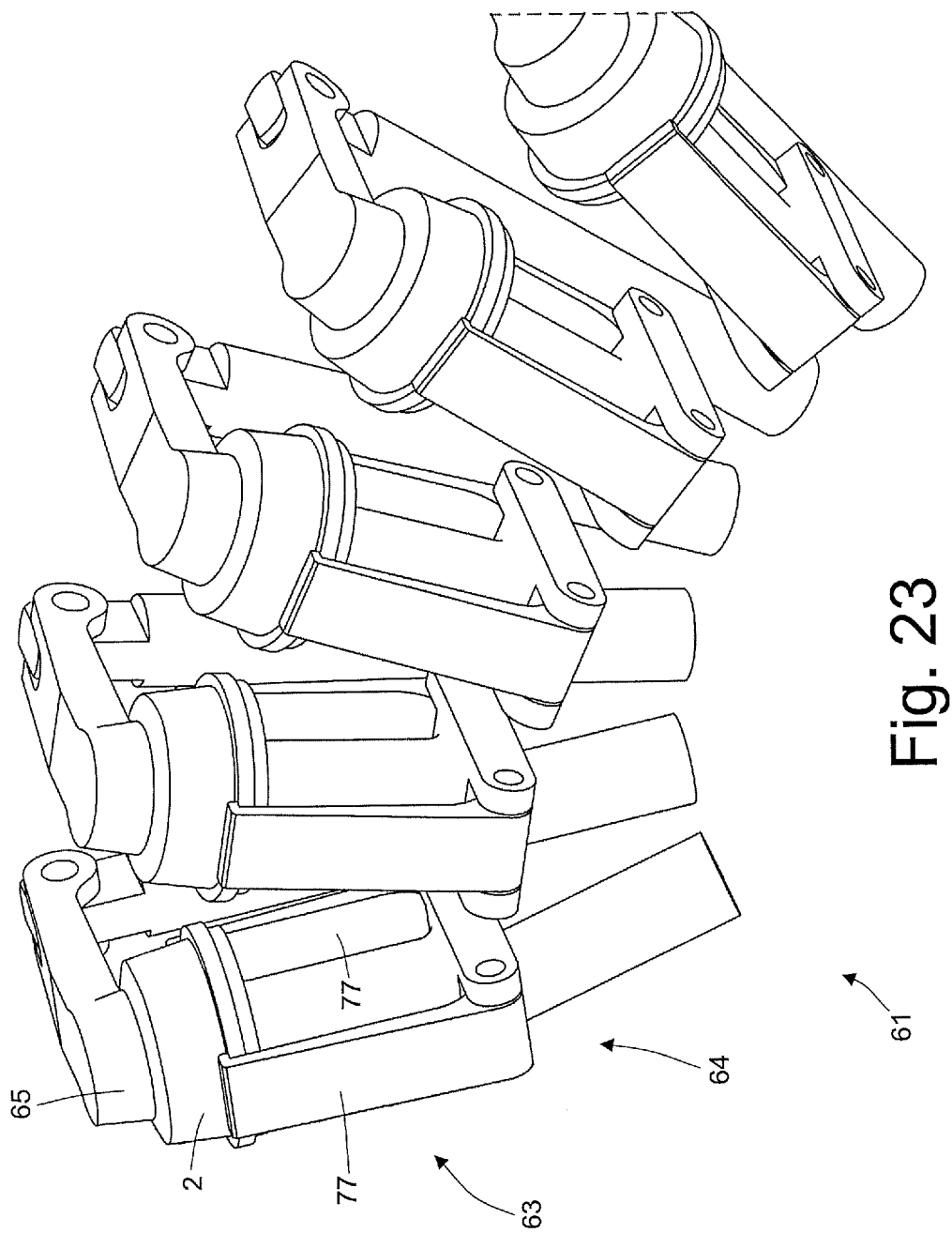
FIG. 23 is a schematic perspective view of part of a control wheel of the application unit of FIG. 20.

As illustrated in FIG. 20, the application unit 12 comprises a control wheel 61 that is vertically arranged, being rotatably mounted about a horizontal rotation axis 62 (and parallel to the rotation axis 55) and is suited to turn with continuous motion (or with constant speed) about the rotation axis 62 itself to cyclically advance along a circular control path. The control wheel 61 is arranged immediately downstream from the sealing wheel 54 and receives in succession from the sealing wheel 54 itself the hollow bodies 2 provided with the corresponding top walls 4 (in addition, of course, to the bottom walls 3 previously applied); the function of the control wheel 61 is to check the tightness (leak-proof) of the seal between each hollow body 2 and the corresponding top wall 4. As illustrated in FIG. 23, the control wheel 61 supports a plurality of control heads 63, each of which comprises a retaining device 64 suited to retain the corresponding hollow body 2 and a control member 65 that is suited to couple with the hollow body 2 to check the tightness of the seal between the hollow body 2 and the top wall 4. According to a preferred embodiment, each control head 63 is hinged to the control wheel 61 to rotate with respect to the control wheel 61 itself about a rotation axis parallel to and spaced with respect to the rotation axis 62; the respective movement between each control head 63 and the control wheel 61 allows to confer to the control head 63 a particular orientation in the moment in which the control head 63 receives or transfers the corresponding hollow body 2.

As illustrated in FIG. 22, each sealing head 56 comprises a sealing member 66, which has an annular shape, surrounding the gripping device 57, and is movable radially (i.e. perpendicular to the rotation axis 55) between a rest position (illustrated in FIG. 22) in which the sealing member 66 is detached from the top wall 4 gripped by the gripping device 57 and a work position (illustrated in part of FIG. 20) in which the sealing member 66 is in contact with the top wall 4 gripped by the gripping device 57 on the opposite side with respect to the hollow body 2 (in other words, the top wall 4 is arranged in the middle between the hollow body 2 on one side, and the sealing member 66 on the other). Preferably, each sealing member 66 is moved radially (as described above) by the movement generated by a linear electric motor of the "voice coil" type; thanks to the use of said linear electric motor both the position of the sealing member 66 and the thrust (pressure) that the sealing member 66 exerts during sealing can be controlled very precisely. In this way, it is possible to adjust the thrust (pressure) that the sealing member 66 exerts during the seal to adapt the thrust (pressure) to the type of material to be sealed. The sealing member 66 is constantly heated by a heater embedded in the inside (typically one or more heat-resistors) to be always maintained at a predetermined sealing temperature (generally depending both on the type of material to be sealed, and, possibly, on the effective working speed of the packaging machine 9).

According to a preferred embodiment, the retaining device 58 is arranged at the sealing member 66 and from the opposite side with respect to the top wall 4 so that the top wall 4 and the corresponding portion of the hollow body 2 are clamped between the sealing member 66 and the retaining device 58 when the sealing member 66 is moved into the work position. According to a preferred embodiment, the retaining device 58 comprises two jaws 67 that are movable one with respect to the other between a rest position (illustrated in FIG. 22) in which the two jaws 67 are apart from each other allowing the hollow body 2 to move with respect to the sealing head 56 and a retaining position (illustrated in part of FIG. 20) in which the two jaws 67 are close to each other and engage the hollow body 2 by preventing the hollow body 2 itself to move with respect to the sealing head 56. In other words, the two jaws 67 of each retaining device 58 act as a clamp for clamping in between a corresponding hollow body 2. Each jaw 67 has a central semi-circular cavity 68 which reproduces in negative the shape of the hollow body 2, so as to tighten without appreciably deforming the hollow body 2 itself.

According to a preferred embodiment illustrated in FIG. 22, each gripping device 57 comprises a suction cup element 69 (rigid or at least partly elastic) connectable with a suction source; obviously when and only it is necessary to retain a top wall 4, by means of the suction cup element 69 to the corresponding gripping device 57 the suction is activated.

As illustrated in FIG. 20, in use the sealing wheel 54 transfers in succession the hollow bodies 2 (provided with the walls 3 and 4) to the control wheel 61 in a transfer station 70.

The sealing wheel 54 is quite similar to the sealing wheel 13 described above, for which for the description of the operation of the wheel 54 reference is made to that previously said about the operation of the sealing wheel 13.

Figure 21:
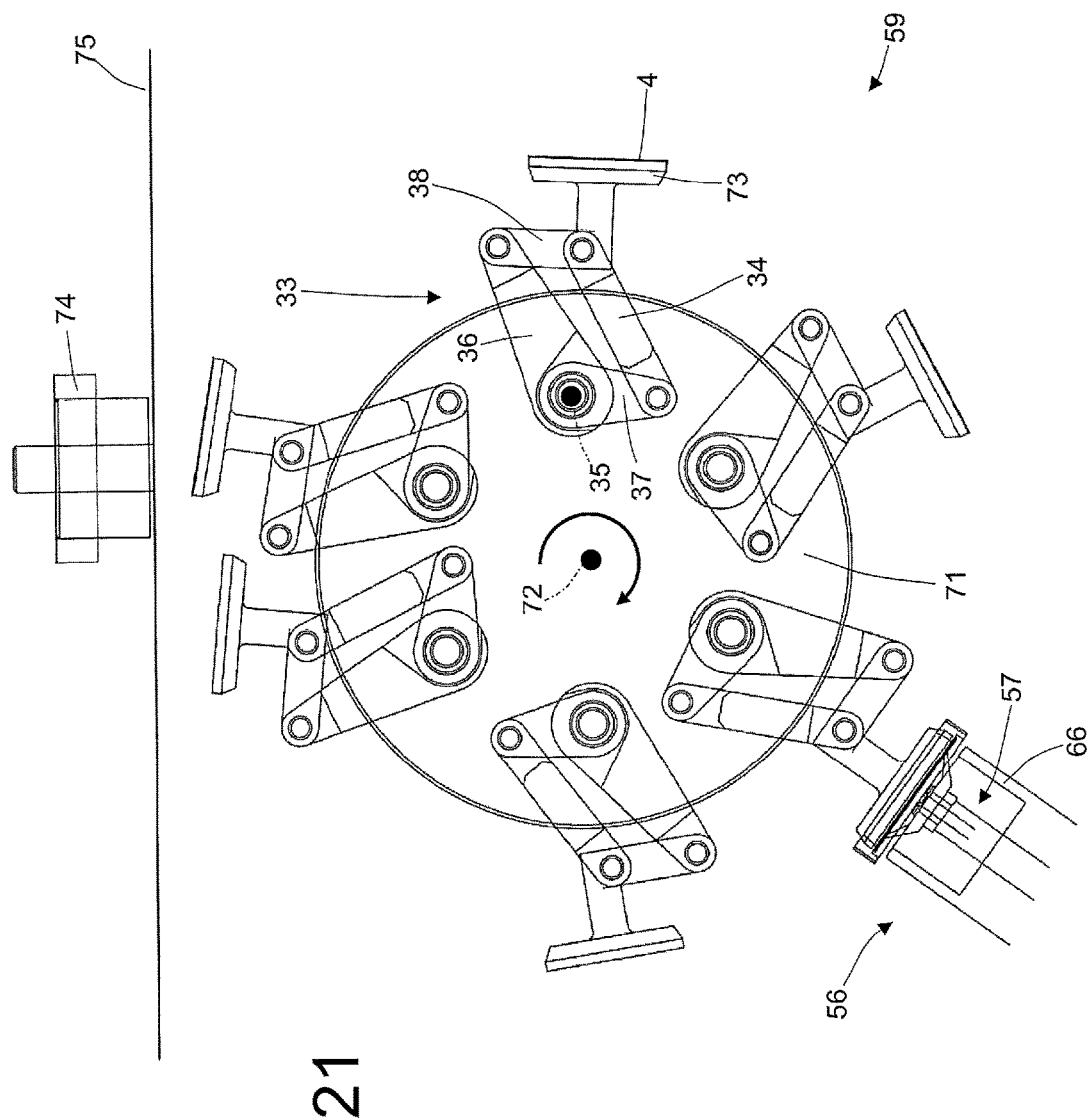
FIG. 21 is a schematic front view of a feed station of the application unit of FIG. 20.

As illustrated in FIG. 21, the feed station 59 comprises a feed wheel 71, which is arranged vertically, is rotatably mounted about a horizontal rotation axis 72 (and parallel to the rotation axis 55) and is suited to turn with continuous motion (or with constant speed) about the rotation axis 72 itself to cyclically advance along a circular feed path. The feed wheel 71 supports an assembly of suction gripping heads 73, each of which is suited to retain a corresponding top wall and is movably mounted on the feed wheel 71 to move with respect to the feed wheel 71 itself; the respective movement between each suction gripping head 73 and the feed wheel 71 allows to confer the suction gripping head 73 a particular orientation in the instant in which the suction gripping head 73 receives or transfers the corresponding top wall 4.

According to a preferred (but not binding) embodiment illustrated in FIG. 7, each suction gripping head 73 is connected to the feed wheel 71 by means of the interposition of an articulated parallelogram 33 which determines the movement of the suction gripping head 73 with respect to the feed wheel 71. Each articulated parallelogram 33 comprises a rod 34 hinged at one end to the feed wheel 71 to rotate about a rotation axis 35 parallel to the rotation axis 72, a rod 36 which is opposite and parallel to the rod 34, a rod 37 that connects the rod 34 to the rod 36 at the end of the rod 34 hinged to the feed wheel 71, and a ("L" shaped) rod 38 that is parallel and opposite to the rod 37 and supports the suction gripping head 73.

The feed station 59 comprises a cutting device 74, which is suited to cut in succession the top wall 4 from a continuous strip 75 of plastic material unwound from a spool (illustrated in FIGS. 1, 2 and 3). The cutting device 74 is arranged alongside the feed wheel 71 and cooperates with the feed wheel itself; in particular, each suction gripping head 73 is suited to rest on the continuous strip 75 of plastic material on the opposite side with respect to the cutting device 74 just before the cutting device 74 cuts the continuous strip 75 of material to separate the corresponding top wall 4 so as to counteract the cutting action and so as to retain the top wall 4, once the top wall 4 has been cut off the continuous strip of material. According to a preferred embodiment illustrated in FIG. 20, downstream from the cutting device 74 a shredder 76 is arranged that shreds the remaining part of the continuous strip 75 of material after the top walls 4 have been separated.

As illustrated in FIG. 21, in use the continuous rotation of the feed wheel 71 about the rotation axis 72 brings each suction gripping head 73 to receive a corresponding top wall 4 from the cutting device 74 (during the receiving of the top wall 4, the suction gripping head 73 moves with respect to the feed wheel 71 for coupling with the cutting device 74), and then subsequently to transfer the top wall 4 to a corresponding sealing head 56 (during the transfer of the top wall 4, the suction gripping head 73 moves with respect to the feed wheel 71 for coupling with the sealing head 56).

As illustrated in FIG. 23, the retaining device 64 of each control head 63 comprises two jaws 77 movable with respect to each other between a rest position (illustrated in part of FIG. 20) in which the two jaws 77 are apart from each other allowing the corresponding hollow body 2 to move radially with respect to the control head 63 and a retaining position (illustrated in part of FIG. 20 and FIG. 23) in which the two jaws 77 are close to each other and engage the hollow body 2 by preventing the corresponding hollow body 2 from moving with respect to the control head 63. In other words, the two jaws 77 of each retaining device 64 act as a clamp for clamping between themselves a corresponding hollow body 2.

In each control head 63, the control member 65 is arranged alongside the jaws 77 and is hinged to the control head 63 to be movable from and to a work position (illustrated in FIG. 23) in which the control member 65 rests on the hollow body 2 at the top wall 4. In other words, when a hollow body 2 enters the corresponding control head 63 and is engaged by the jaws 77 of the retaining device 64 the control member 65 is in a rest position apart from the work position (visible in FIG. 20); subsequently, the control member 65 is moved into the work position (illustrated in FIG. 23) to perform the control of the tightness of the seal between the top wall 4 and the hollow body 2, and then at the end of the control of the seal the control member 65 is moved back to the rest position apart from the work position to allow easy exit of the hollow body 2 from the control head 63. In the work position, each control member 65 completely covers the top wall 4 to check the air tightness of the corresponding hollow body 2 by testing for any gas leakage from inside the hollow body 2. According to a preferred embodiment illustrated in FIG. 20, the application unit 12 comprises a feed device 78, which feeds a predetermined dose of a control gas (e.g. nitrogen and/or hydrogen) inside the hollow body 2 before applying the top wall 4 to the hollow body 2 itself, and then each control member 65 tests for an abnormal concentration (with respect to the atmosphere) of said control gas about the top wall 4 of the corresponding hollow body 2.

In use, the continuous rotation of the control wheel 61 about the rotation axis 62 brings each control head 63 to receive in the transfer station 70 a corresponding hollow body 2 from a sealing head 56 of the sealing wheel 54 (during the reception of the hollow body 2, the control head 63 moves with respect to the control wheel 61 for coupling with the corresponding sealing head 56 of the sealing wheel 54), and then subsequently to transfer the hollow body 2 to an output conveyor 79 in a transfer station 80 (during the transfer of the hollow body 2, the control head 63 moves with respect to the control wheel 61 for coupling with the output conveyor 79).

According to a possible embodiment not illustrated, to the filling conveyor 47 a feed device may be coupled, which is arranged downstream from the filler devices 49 and 52 (i.e. between the filler devices 49 and 52 and the sealing wheel 54) and is suited to engage each hollow body 2 carried by the filling conveyor 47 to a corresponding element (for example a filter element).

According to a possible embodiment not illustrated, along the output conveyor 79 a reject device is provided which eliminates the capsules 1 that were previously identified as faulty during the controls performed in the control wheels 20 and 61. When a hollow body 2 is judged faulty already on the control wheel 20 it is preferable not to fill the hollow body 2 itself in the filling unit 11; to this purpose, each filler member 50 of the filler devices 49 and 52 can be individually locked to prevent the filling of a corresponding defective hollow body 2.

In the embodiment illustrated in the attached figures, each application station 10 and 12 comprises only one sealing wheel 13 or 54 and then at each application station 10 and 12 only one sealing operation is performed. According to an alternative embodiment not illustrated, the application station 10 comprises two sealing wheels 13 arranged in series one after the other and/or the application station 12 comprises two sealing wheels 54 arranged in series one after the other; in this way, in the sealing station 10 and/or 12 two successive sealing operations are performed: in a first sealing wheel 13 or 54 arranged upstream a first seal is performed and in a second sealing wheel 13 or 54 arranged downstream a second seal temporally subsequent and potentially different from the first seal is performed. Obviously, the two seals can be performed with sealing parameters (typically temperature and pressure) differentiated and optimized one from the other for the different objectives of the two seals themselves. According to a preferred embodiment, between two successive sealing wheels 13 or 54 a transfer wheel is interposed transferring the hollow bodies 2 from the first sealing wheel 13 or 54 arranged upstream to the second sealing wheel 13 or 54 arranged downstream.

For example, the first seal may concern a limited portion of the annular edge 6 or 8 of the hollow body 2 (punctiform seal area, or circular arc shaped seal area) while the second seal may be of an annular type to affect the whole annular edge 6 or 8 of the hollow body 2; in other words, the first seal fixes the wall 3 or 4 to the annular edge 6 or 8 of the hollow body 2 at one point while the second seal obtains a complete union and without solution of continuity between the wall 3 or 4 and the annular edge 6 or 8 of the hollow body 2. Alternatively, the first seal may be of an annular type to affect the entire annular edge 6 or 8 of the hollow body 2 and the second seal may concern a limited portion of the annular edge 6 or 8 of the hollow body 2 (punctiform sealing area, or circular arc shaped sealing area); in other words, the first seal obtains a complete union and without solution of continuity between the wall 3 or 4 and the annular edge 6 or 8 of the hollow body 2 while the second seal fixes with greater force the wall 3 or 4 to the annular edge 6 or 8 of the hollow body 2 at one point. Alternatively, both the first seal, and the second seal may be annular to affect the entire annular edge 6 or 8 of the hollow body 2; in other words, the second seal reinforces the first seal (in this case the two seals are arranged at a small distance from each other so as to be one inside the other). The packaging machine 9 described above has numerous advantages.

In the first place, the packaging machine 9 described above allows to achieve high hourly productiveness (i.e., a number of pieces produced in the time unit) while ensuring a high quality standard for the capsule 1. This result is obtained thanks to the fact of making the entire packaging machine 9 working in a continuous manner, i.e. always moving at a constant speed, instead of using the intermittent mode which provides a cyclic succession of rest and movement steps; in fact, by operating in a continuous way the packaging machine 9 can reach high hourly production without subjecting, at the same time, the products to intense mechanical stresses (or accelerations/decelerations).

In addition, the packaging machine 9 described above is also easy and inexpensive to manufacture, as it is composed of structurally simple elements presenting few and easily obtained movements.

Finally, the packaging machine 9 described above provides adequate maneuvering space around each component, and then both the initial assembly of the components and subsequent maintenance (from simple cleaning to the replacement) of the components themselves are simplified.

The invention claimed is:

1. An application unit (10; 12) for applying a wall (3; 4) to a hollow body (2) in a manufacturing process for producing a beverage capsule (1); the application unit (10; 12) comprises:
    at least one sealing conveyor (13; 54) which advances along a sealing path;
    at least one sealing head (15; 56) conveyed by the sealing conveyor (13; 54) and supporting a gripping device (16; 57) suited to grip the wall (3; 4) for advancing the wall (3; 4) along the sealing path; and
    a first feed station (18; 59) for feeding the wall (3; 4) to the sealing head (15; 56), so that the wall (3; 4) is gripped by the gripping device (16; 57);
    wherein the sealing head (15; 56) comprises a first retaining device (17; 58) suited to grip the hollow body (2) for advancing the hollow body (2) along the sealing path;

wherein a second feed station (19; 60) arranged downstream from the first feed station (18; 59) along the sealing path, for feeding the hollow body (2) to the sealing head (15; 56) is provided, so that the hollow body (2) is coupled to the wall (3; 4) gripped by the gripping device (16; 57), and is retained by the first retaining device (17; 58); and wherein the sealing head (15; 56) comprises an annular sealing member (25; 66) surrounding the gripping device (16; 57) and movable between a rest position, in which the sealing member (25; 66) is detached from the wall (3; 4) gripped by the gripping device (16; 57), and a work position, in which the sealing member (25; 66) contacts the wall (3; 4) gripped by the gripping device (16; 57), on the opposite side to the hollow body (2); the sealing member (25; 66) being maintained in the rest position at the feed stations (18, 19) and being moved into the work position downstream from the second feed station (19; 60).

2. The application unit (10; 12) according to claim 1, wherein the first retaining device (17; 58) is arranged at the sealing member (25; 66) and on the opposite side with respect to the wall (3; 4), so that the wall (3; 4) and the corresponding portion of the hollow body (2) are gripped between the sealing member (25; 66) and the first retaining device (17; 58) when the sealing member (25; 66) is moved into the work position.

3. The application unit (10; 12) according to claim 1, wherein the first retaining device (17; 58) comprises two first jaws (26; 67) movable with respect to each other between a rest position, in which the two first jaws (26; 67) are apart from each other allowing the hollow body (2) to move with respect to the sealing head (15; 56), and a retaining position, in which the two first jaws (26; 67) are close to each other and engage the body (2) preventing the hollow body (2) itself from moving with respect to the sealing head (15; 56).

4. The application unit (10; 12) according to claim 3, wherein the first jaws (26; 67) of the first retaining device (17; 58) are moved into the rest position as the hollow body (2) enters and exits the sealing head (15; 56), and are moved to the retaining position when the hollow body (2) is housed inside the sealing head (15; 56).

5. The application unit (10; 12) according to claim 1, wherein the gripping device (16; 57) comprises a suction cup member (28; 69) connectable to a suction source.

6. The application unit (10; 12) according to claim 1, wherein:
the sealing conveyor (13; 54) is defined by a sealing wheel mounted to rotate continuously about a first rotation axis (14; 55); and
the sealing member (25; 66) is movable radially between the rest position and the work position.

7. The application unit (10; 12) according to claim 1, wherein the first feed station (18; 59) comprises a first feed wheel (30; 71), which is rotatably mounted to rotate with continuous motion about a second rotation axis (31; 72), and supports a first suction gripping head (32; 73) which is suited to engage the wall (3; 4) and is fitted to the first feed wheel (30; 71) so as to move with respect to the first feed wheel (30; 71) itself.

8. The application unit (10; 12) according to claim 7, wherein the first suction gripping head (32; 73) is connected to the first feed wheel (30; 71) with the interposition of an articulated parallelogram (33).

9. The application unit (10; 12) according to claim 8, wherein the articulated parallelogram (33) comprises a first rod (34) which is hinged at one end to the first feed wheel (30; 71), a second rod (36) opposite and parallel to the first rod (34), a third rod (37) which connects the first rod (34) to the second rod (36) at the end of the first rod (34) hinged to the first feed wheel (30; 71), and a fourth rod (38) which is opposite and parallel to the third rod (37) and supports the first suction gripping head (32; 73).

10. The application unit (10; 12) according to claim 7, wherein the first feed station (18; 59) comprises a cutting device (39; 74), which is suited for cutting the wall (3; 4) off a continuous tape (40; 75) of material and arranged alongside the first feed wheel (30; 71).

11. The application unit (10; 12) according to claim 10, wherein the first suction gripping head (32; 73) is suited to rest on the opposite side of the continuous strip (40; 75) of material with respect to the cutting device (39; 74), just before the cutting device (39; 74) cuts the wall (3; 4) off the continuous strip (40; 75) of material, so as to counteract the cutting action and retain the wall (3; 4) once it is cut off the continuous strip (40; 75) of material.

12. The application unit (10; 12) according to claim 10, wherein a shredder (41; 76), downstream from the cutting device (39; 74), shreds the rest of the continuous strip (40; 75) of material once the wall (3; 4) has been cut off.

13. The application unit (10; 12) according to claim 1, wherein the second feed station (19; 60) comprises a second feed wheel (42), which is mounted to rotate continuously about a third rotation axis (43) and supports a second suction gripping head (44) which is suited to engage the hollow body (2) and is fitted to the second feed wheel (42) so as to move with respect to the second feed wheel (42) itself.

14. The application unit (10; 12) according to claim 13, wherein the second suction gripping head (44) is connected to the second feed wheel (42) with the interposition of an articulated parallelogram (33).

15. The application unit (10; 12) according to claim 14, wherein the articulated parallelogram (33) comprises a first rod (34) hinged at one end to the second suction gripping head (44), a second rod (36) opposite and parallel to the first rod (34), a third rod (37) connecting the first rod (34) to the second rod (36) at the end of the first rod (34) hinged to the second suction gripping head (44), and a fourth rod (38) opposite and parallel to the third rod (37) and supporting the second suction gripping head (44).

16. The application unit (10; 12) according to claim 13, wherein the second feed station (19; 60) comprises a hopper (45), which is suited to house a stack of hollow members (2), is arranged alongside the second feed wheel (42) and has an outlet opening suited to be engaged by the second suction gripping head (44) to withdraw a hollow body (2).

17. The application unit (10; 12) according to claim 1 and comprising:
a control conveyor (20; 61), which advances along a control path, is arranged downstream from the sealing conveyor (13; 54) and receives the hollow body (2) provided with the wall (3; 4), from the sealing conveyor (13; 54); and
a control head (22; 63) conveyed by the control conveyor (20; 61), and which supports a second retaining device (23; 64) suited for retaining the hollow body (2) and a control member (24; 65) which is suited to engage the hollow body (2) to check the seal between the hollow body (2) and the wall (3; 4).

18. The application unit (10; 12) according to claim 17, wherein the second retaining device (23; 64) comprises two second jaws (46; 77) movable with respect to each other between a rest position, in which the two second jaws (46;

77) are apart from each other allowing the hollow body (2) to move with respect to the control head (22; 63) and a retaining position, in which the two second jaws (46; 77) are close to each other and engage the body (2) preventing the hollow body (2) itself from moving with respect to the control head (22; 63).

19. The application unit (10; 12) according to claim 17, wherein the control member (24) is movable to and from a work position, in which the control member (24) rests on the hollow body (2), on the opposite side to the wall (3).

20. The application unit (10; 12) according to claim 19, wherein in the work position, the control member (24) surrounds an opening (7) in the hollow body (2) to pressurize or depressurize an inner cavity of the hollow body (2) also bounded by the wall (3), and therefore to determine the air tightness of the hollow body (2) by testing for any changes in pressure.

21. The application unit (10; 12) according to claim 17, wherein the control member (65) is movable to and from a work position, in which the control member (65) rests on the hollow body (2), on the same side as the wall (4).

22. The application unit (10; 12) according to claim 21, wherein in the work position, the control member (65) completely covers the wall (4) to check the air tightness of the hollow body (2) by testing for any gas leakage from inside the hollow body (2).

23. The application unit (10; 12) according to claim 22 and comprising a feed device (78) for feeding a given amount of control gas into the hollow body (2) before the wall (4) is applied to the hollow body (2) itself.

24. The application unit (10; 12) according to claim 1 and comprising two twin sealing conveyors (13; 54) that are arranged in series one after the other along a sealing path to perform two temporally successive sealing operations.

25. An application method for applying a wall (3; 4) to a hollow body (2) in a manufacturing process for producing a beverage capsule (1); the application method comprises the steps of:
cyclically advancing along a sealing path at least one sealing conveyor (13; 54) having at least one sealing head (15; 56), which supports a gripping device (16; 57) suited for gripping the wall (3; 4) to advance the wall (3; 4) along the sealing path;
feeding the wall (3; 4) to the sealing head (15; 56), at a first feed station (18; 59), so that the wall (3; 4) is gripped by the gripping device (16; 57);
wherein the sealing head (15; 56) comprises a first retaining device (17; 58) suited to grip the hollow body (2) to advance the hollow body (2) along the sealing path;
is fed to the sealing head (15; 56), at a second feed station (19; 60) downstream from the first feed station (18; 59) along the sealing path, so that the hollow body (2) is coupled to the wall (3; 4) gripped by the gripping device (16; 57), and is retained by the retaining device (17; 58); and
wherein the sealing head (15; 56) comprises an annular sealing member (25; 66) surrounding the gripping device (16; 57) and movable between a rest position, in which the sealing member (25; 66) is detached from the wall (3; 4) gripped by the gripping device (16; 57), and a work position, in which the sealing member (25; 66) contacts the wall (3; 4) gripped by the gripping device (16; 57), on the opposite side to the hollow body (2); the method further comprising the step of maintaining the sealing member (25; 66) in the rest position at the feed stations (18, 19) and moving the sealing member (25; 66) into the work position downstream from the second feed station (19; 60).

* * * * *